United States Patent [19]

Miyamoto

[11] Patent Number: 5,446,732
[45] Date of Patent: Aug. 29, 1995

[54] METHOD OF AND APPARATUS FOR SIGNALLING BETWEEN NODES IN NETWORK

[75] Inventor: Naoyuki Miyamoto, Kawasaki, Japan

[73] Assignee: Fujitsu Limited, Kanagawa, Japan

[21] Appl. No.: 136,583

[22] Filed: Oct. 14, 1993

[30] Foreign Application Priority Data

Oct. 14, 1992 [JP] Japan .................................. 4-275600

[51] Int. Cl.⁶ .......................................... H04Q 11/04
[52] U.S. Cl. .................. 370/58.2; 370/110.1
[58] Field of Search .............. 370/58.1, 58.2, 58.3, 370/110.1, 54, 60, 94.1, 60.1; 379/220, 221, 229, 230, 231, 232, 233, 234

[56] References Cited

U.S. PATENT DOCUMENTS

5,212,691  5/1993  Hokari ............................ 370/110.1

FOREIGN PATENT DOCUMENTS

56-8954  1/1981  Japan .
1226261  9/1989  Japan .

Primary Examiner—Douglas W. Olms
Assistant Examiner—Dang Ton

[57] ABSTRACT

A network is constructed by connecting trunk circuits through a trunk in an exchange in which the trunk circuit connects with a trunk, an extension circuit connects with a terminal, and the trunk circuit is connected to the extension circuit by a path switch controlled by a calling processor and by connecting the terminals to the extension circuit. Control information is transmitted and received by utilizing a channel of a not-in-service trunk up to a time before receiving a response of a remote party to a trunk connection call. The control information is transmitted and received by utilizing a no-signal area in the trunk from a time after receiving the response of the remote party to the trunk connection call to an end-of-service time. The control information on the connection call between two exchanges and the control information on an operational management maintenance of the exchanges are thereby transmitted and received.

36 Claims, 19 Drawing Sheets

METHOD OF AND APPARATUS FOR SIGNALLING BETWEEN NODES IN NETWORK

BACKGROUND OF THE INVENTION

1. Field of the Invention

The present invention relates generally to a signalling system between nodes such as exchanges or transit switching equipments and, more particularly, to an inter-node controlling method and apparatus in a digital network constructed of, e.g., a digital link.

2. Description of the Related Art

In recent years, utilization of a communications technology of ISDN (integrated services digital network) has been developed. In Japan, the TTC (Telecommunication Technology Committee) recommends the common-channel signalling as a standard system of common-circuit signalling between circuit exchanges in a private network in conformity with the international standards such as CCITT (comité consultatif international télégraphique et téléphonique).

With this recommendation, there is promoted an attempt to offer products of ISDN-PBX (private branch exchange) in which standard or maker's own non-standard common-circuit signalling is applied to a circuit exchange of the private network. Developed are a variety of communications services utilizing characteristics of such common-circuit signalling and exhibiting a high added value.

On the other hand, a high-speed digital circuit of the public network is hired as a transit line or trunk between circuit exchanges) (hereinafter simply called "exchanges" in the digital network. The network is constructed by time-division per time slot on the order of 64 Kbps. A charge for use of such a circuit channel is generally of a monthly fixed rate system and comparatively high.

In the common-circuit signalling such as the above common-channel signalling, control signals of call initiating, dialing and connecting can be treated as a message. It is therefore possible to transmit and receive a large amount of and multiple pieces of control information between the exchanges.

For instance, according to a conventional network system using the common-channel signalling, the control information per service circuit, i.e., service channel is collected for a plurality of channels. The thus collected control information is transmitted and received via a private channel between the exchanges.

FIG. 1 illustrates one example of the conventional network system using the common-channel signalling. The system of FIG. 1 includes exchanges 101, 102, a digital circuit 103 and a plurality of terminals 108, 109.

The exchanges 101, 102 each have calling processors 104, 105 and signalling processors 106, 107. The calling processors 104, 105 perform a calling process relative to the exchange. The signalling processors 106, 107 are functional elements for transmitting and receiving the control information of the common-channel signalling. A plurality of terminals (telephones, etc.) 108, 109 are connected to each of the exchanges 101, 102.

The digital circuit 103 is a high-speed digital communications circuit and includes communications channels a, b, c, d. These communications channels a, b, c, d each include a communications band on the order of, e.g., 64 Kbps. The communications channels a, b, c constitute service channels. Then, the communications channel d constitutes a private channel, i.e., private control channel for transmitting and receiving the control information based on the common-channel signalling.

Referring to FIG. 1, the calling processors 104, 105 of the exchanges 101, 102 each transmit and receive the control information on the service channels a, b, c and the control information on an inter-exchange operational management maintenance between the signalling processors 106, 107. The signalling processors 106, 107 each transmit and receive the control information received from the calling processors 104, 105 between the signalling processors 106, 107 of the corresponding exchanges by use of the private control channel d.

As explained above, one or more control channels d shown in FIG. 1 are needed for the common-channel signalling in the conventional system.

In this connection, FIG. 2 illustrates a relationship between a transmission rate and a communications channel number in the high-speed digital circuit available for domestic use in Japan by way of one example of the high-speed digital circuit of the public network that is employed in the above-mentioned network system. FIG. 2 shows the relationship of channel number versus the one-circuit transmission rate in a transmission path when effecting, e.g., an A/D (analog-to-digital) conversion of a voice into a digital signal and transmitting the signal at 64 Kbps.

More specifically, in the case of a circuit of 64 Kbps, only one 64 Kbps communications channel can be taken. In the case of a circuit of 128 Kbps, two 64 Kbps communications channels can be taken. In the case of a circuit of 256 Kbps, four 64 Kbps communications channels can be taken. Similarly, in the case of a circuit of 1.5 Mbps, twenty four 64 Kbps communications channels can be taken. The digital circuit illustrated in FIG. 1 corresponds to the circuit of 256 Kbps. There are employed four 64 Kbps communications channels a, b, c, d.

FIG. 3 is a connection chart of exchange-to-exchange signalling.

To be more specific, a piece of call setting information is transmitted from a call outgoing exchange to a call incoming exchange in response to a call initiating request given from a terminal connected to the call outgoing exchange. When the call is received on the incoming side, the incoming side is brought into a call incoming accepted status. The call setting acceptance information is transmitted to the outgoing side which also comes into a call initiating acceptance status. Next, calling information is sent from the incoming side, and the incoming side is put into an in-call status. Then, the outgoing side is informed of calling. Further, when the incoming side sends a response notification and becomes a response status. Then, the outgoing side is brought into an in-communications (active) status and sends a piece of response confirming information. The incoming side is also thereby put into the active status. The communications are thus conducted. Disconnect information is sent from the outgoing side in response to a disconnect request. This disconnect information is received by the incoming side and informed of the disconnection. Hereat, the incoming side issues release information and makes a release request. With this operation, the outgoing side becomes a null status, and, simultaneously, release complete information is transmitted to the incoming side. The incoming side is, when receiving this information, brought into the null status, thus completing the communications.

In the conventional system, respective items of control information as shown in FIG. 3 are transferred and received via a control channel for exclusive use of control.

According to the conventional network system which adopts the common-channel signalling, one or more dedicated control channels have to be certainly prepared for transmitting and receiving the control information on the service channel communications except the communications channels as service channels based on a calculation from a traffic.

The control information for the plurality of service channels is transmitted and received between the exchanges via the above-mentioned dedicated control channels. Hence, a channel active efficiency decreases with a fewer number of service channels. Namely, the following relationship is established:

10-Channel Control Information Quantity ÷ Carriable-via-One-Channel Information Quantity >> 2-Channel Control Information ÷ Carriable-via-One-Channel Information Quantity Accordingly, in the conventional system based on the common-channel signalling, if the service channel number calculated from the traffic is as small as several channels or less, the active efficiency of the dedicated control channel is small and therefore not economical.

Further, seeing from a different angle, as far as the communications services offered according to the common-channel signalling are not sufficiently useful to the customers, they apt to think it expensive to prepare the private channels. The customers are conservative about adopting the common-channel signalling, and this in turn hinders a spread thereof.

As discussed above, the increment in charges for using the circuit due to the adoption of the common-channel signalling is one of factors to hinder the spread of the common-channel signalling.

SUMMARY OF THE INVENTION

It is a primary object of the present invention to provide an inter-node controlling method and apparatus in a network that are capable of transmitting and receiving control information based on the common-channel signalling in the form of control messages by use of service channels between nodes without providing dedicated control channels and of utilizing circuits at a high efficiency even when the number of communications channels is small.

According to one aspect of the present invention, there is provided an inter-node controlling system in a network for transmitting and receiving control information, the network being constructed by connecting trunk circuits of a plurality of exchanges through trunks and connecting one or more terminals to the extension circuit, the exchanges each including: a calling processor for performing a calling process; a trunk circuit for connecting trunks; an extension circuit for connecting terminals; and a path switch for selectively connecting the trunk circuits to the extension circuit under control of the calling processor. The system comprises, when performing signalling relative to communications between the exchanges, the steps of: transmitting and receiving at least one item of control information on a connection call between the exchanges and on an operational management maintenance of the exchanges by utilizing a channel of a not-in-service trunk from a time when the trunk connection call (for connecting the trunk) takes place to a time before receiving a response of a remote party; and transmitting and receiving the control information by utilizing a do-nothing communications interval in the channel of the trunk from a time after receiving the response of the remote party with respect to the trunk connection call to an end-of-communications time.

According to another aspect of the present invention, there is provided an inter-node controlling system in a network for transmitting and receiving control information, the network being constructed by connecting, through a trunk, two trunk circuits of a node consisting of an exchange including a calling processor for performing a calling process; a trunk circuit for connecting the trunk; an extension circuit for connecting a terminal; and a path switch for selectively connecting the trunk circuit to the extension circuit under control of the calling processor, and a node consisting of a circuit transit switching equipment including: a trunk circuit for connecting a trunk; an extension circuit for connecting a terminal and a calling processor for controlling the trunk circuit and the extension circuit and by connecting one or more terminals to each extension circuit. The system comprises, when performing signalling relative to communications between the nodes, the steps of: transmitting and receiving at least one item of control information on a connection call between the nodes and on an operational management maintenance of the exchanges by utilizing a channel of a not-in-service trunk from a time when the trunk connection all takes place to a time before receiving a response of a remote party; and transmitting and receiving the control information by utilizing a do-nothing communications interval in the channel of the trunk from a time after receiving the response of the remote party with respect to the trunk connection call to an end-of-communications time.

In any system described above, the trunk circuit includes a line processor for effecting a circuit connecting process, a control information memory for storing the control information and a trunk-side memory for storing information transmitted and received between the trunk circuit and the trunk. The control information may be transmitted and received by utilizing an upward/downward communications channel in the channels of the trunk by performing a transmitting process in which the line processor transmits the control information retained in the control information memory to the trunk-side memory from the time when the trunk connection call takes place to the time before receiving the response of the remote party and a receiving process in which the control information memory stores the control information retained in the trunk-side memory.

Further, in any system given above, the trunk circuit of the node includes a line processor for effecting a circuit connecting process, a control information memory for storing the control information, a trunk-side memory for storing information transmitted and received between the trunk circuit and the trunk and an extension-side memory for storing information transmitted and received between the trunk circuit and the terminal. The control information may be transmitted and received by utilizing the do-nothing communications interval in the channels of the in-communication trunk by performing a control information inserting process in which the line processor inserts the control information within the control information memory into do-nothing communications flag patterns indicating a continuous do-nothing communications status that are retained in the extension-side memory and transmits an inserted result to the trunk-side memory from the time after receiving the response of the remote party with respect to the trunk connection call to the end-of-communications time and a control information fetching process in which the control information is fetched out of the information containing the control information and the do-nothing communications flag patterns retained in said trunk-side memory and is then stored in the control information memory.

Moreover, in the systems stated above, the control information inserting process may involve replacing i-pieces of do-nothing communications flag patterns after a predetermined number a of do-nothing communications flag patterns from the head thereof with i-pieces of control information within the control information memory when a predetermined number m of do-nothing communications flag patterns continuously exist in the extension-side memory and transmitting a replaced result to the trunk-side memory. The control information fetching process may involve storing $(a+1)$th through $(m-a)$th pieces of information in the control information memory when the predetermined number a of do-nothing communications flag patterns continuously exist in the trunk-side memory and if the $(a+1)$th piece of information is defined as the control information, adding the same quantity of do-nothing communications flag patterns as that of the information fetched to the former information and transmitting an added result to the extension-side memory.

Alternatively, in the systems described above, the control information inserting process may involve inserting the i-pieces of control information within the control information memory after the predetermined number a of do-nothing communications flag patterns from the head thereof when the predetermined number m of do-nothing communications flag patterns continuously exist in the extension-side memory and transmitting an inserted result to the trunk-side memory. The control information fetching process may involve storing the $(a+1)$th through $(m-a+1)$th pieces of information in the control information memory when the predetermined number a of do-nothing communications flag patterns continuously exist in the trunk-side memory and if the $(a+1)$th piece of information is defined as the control information, adding the same quantity of do-nothing communications flag patterns as that of the information fetched to the former information and transmitting an added result to the extension-side memory.

Besides, according to the present invention, in any system mentioned above, the inter-exchange communications information may be a voice signal. The do-nothing communications interval may be a silent information interval. The do-nothing communications flag patterns may be silent patterns.

In the systems of this invention, the control information on the operational management maintenance between the exchanges is transmitted and received on the following route. Unlike the conventional system, the special signalling processors are not employed.
Calling Processor—Trunk Circuit—Trunk—Trunk Circuit—Calling Processor Herein, the trunk circuit and the trunk imply those of an arbitrary channel common to the communications channel. No special dedicated channel is employed. Note that the control line between the trunk circuit and the calling processor is generally known as in the "case of using a specific time slot within a path switch" and in the "case of providing a physical bus".

A certain terminal initiates a call, and the trunk is secured by the exchange. For a duration of a process in which the exchange on the incoming side is calling the terminal, i.e., before receiving a response of the terminal on the incoming side, the upward/downward communications band of the relevant channel of the trunk is essentially in a not-in-service status.

According to the present invention, paying attention to this point, the upward/downward service band of the relevant channel of the trunk is employed for transmitting and receiving the control information till the response of a remote party is received. Based further on a method of transmitting and receiving the control information from a time after receiving the response to an end-of-speech time according to the present invention, the control information is transmitted and received by utilizing an interval where information indicating a do-nothing status during a terminal-to-terminal communications (e.g., during services) is continuous.

Accordingly, each exchange is not required to prepare the dedicated channels needed for transmitted and receiving the control information between the nodes in the conventional system based on the common-channel signalling. That is, the control information in the common-channel signalling can be transmitted and received simply by using the trunks corresponding to the service channel number calculated from the traffic.

Additionally, according to the present invention, the control information on a certain trunk can be transmitted and received by employing this trunk. Moreover, the control information on the plurality of trunks can be also transmitted and received by using one arbitrary channel trunk among the plurality of trunks.

As explained above, according to the system of the present invention, the inter-exchange messages in the common-circuit signalling such as the common-channel signalling are transmitted and received via the communications channel of the trunk. Before receiving the response, the channel band is fully employed. After the services, "do-nothing communications information plus control information" in place of the do-nothing communications codes are transmitted and received. The inter-node control is thus conducted. It is therefore possible to transmit and receive the control information of the common-channel signalling to and from the remote party simply by use of the service-oriented trunks the number of which is calculated from the traffic without using the dedicated channel. Hence, if the number of the trunks is as small as 1 or 2 channels, the circuit active efficiency can be improved.

Further, the system of this invention is usable in the form pursuant to the standard system and capable of corresponding to a multi vender without transforming the control information of the common-circuit signalling into other forms or compressing the information or restraining a quantity of the control information.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

[Embodiment 1]

Embodiments of the present invention will hereinafter be described.

Figure 1:
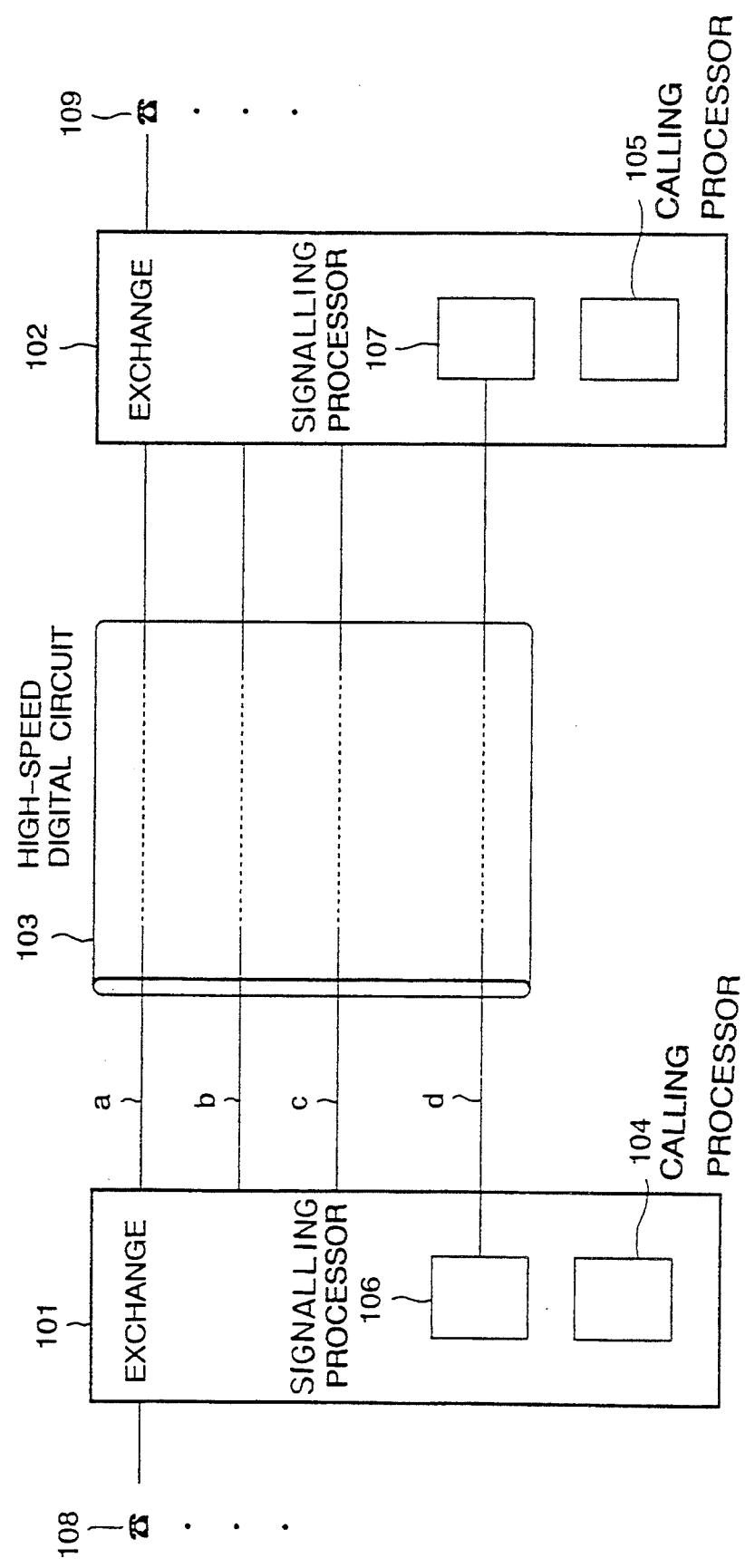
FIG. 1 is a block diagram schematically illustrating one example of a construction of a conventional system using common-channel signalling.
Figure 2:
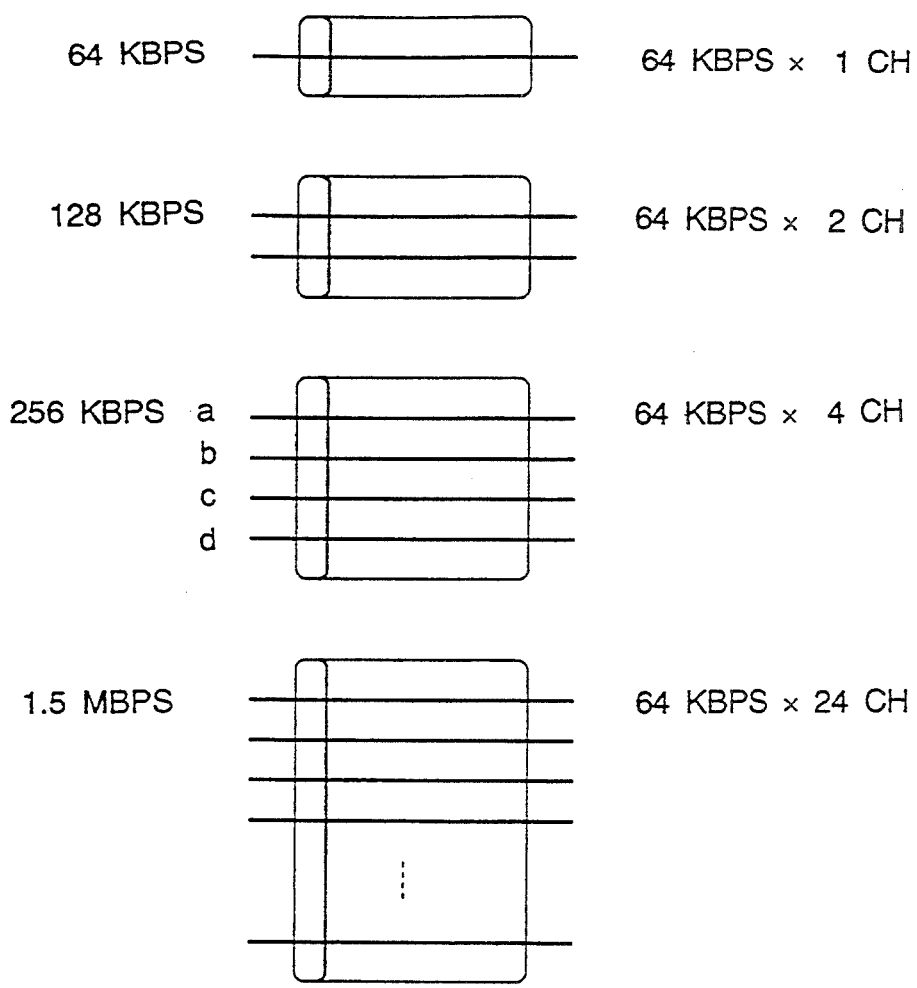
FIG. 2 is an explanatory schematic view showing a high-speed digital circuit.
Figure 3:
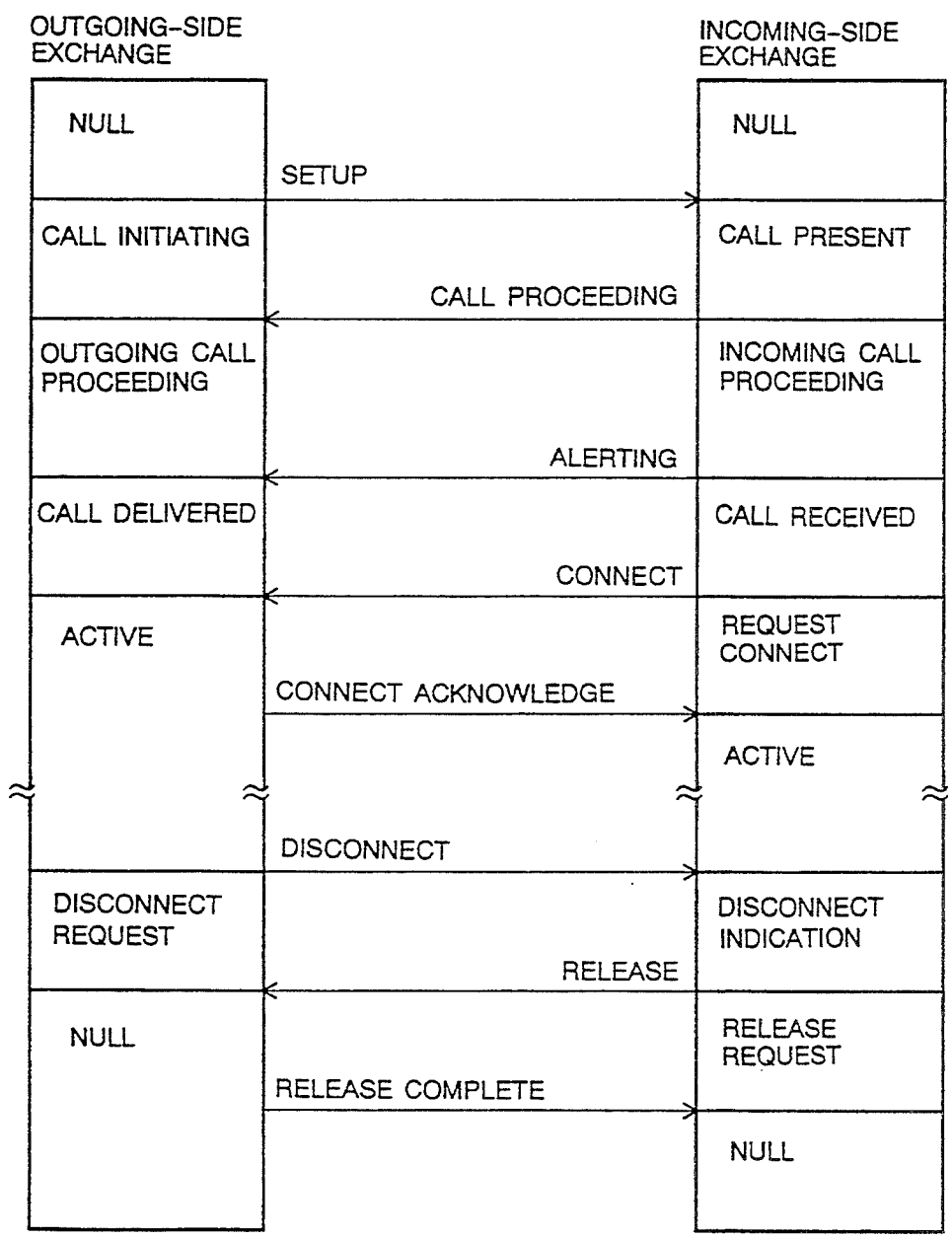
FIG. 3 is an explanatory connection chart showing an outline of how the control information of communications connection in the common-channel signalling is transferred and received.
Figure 4:
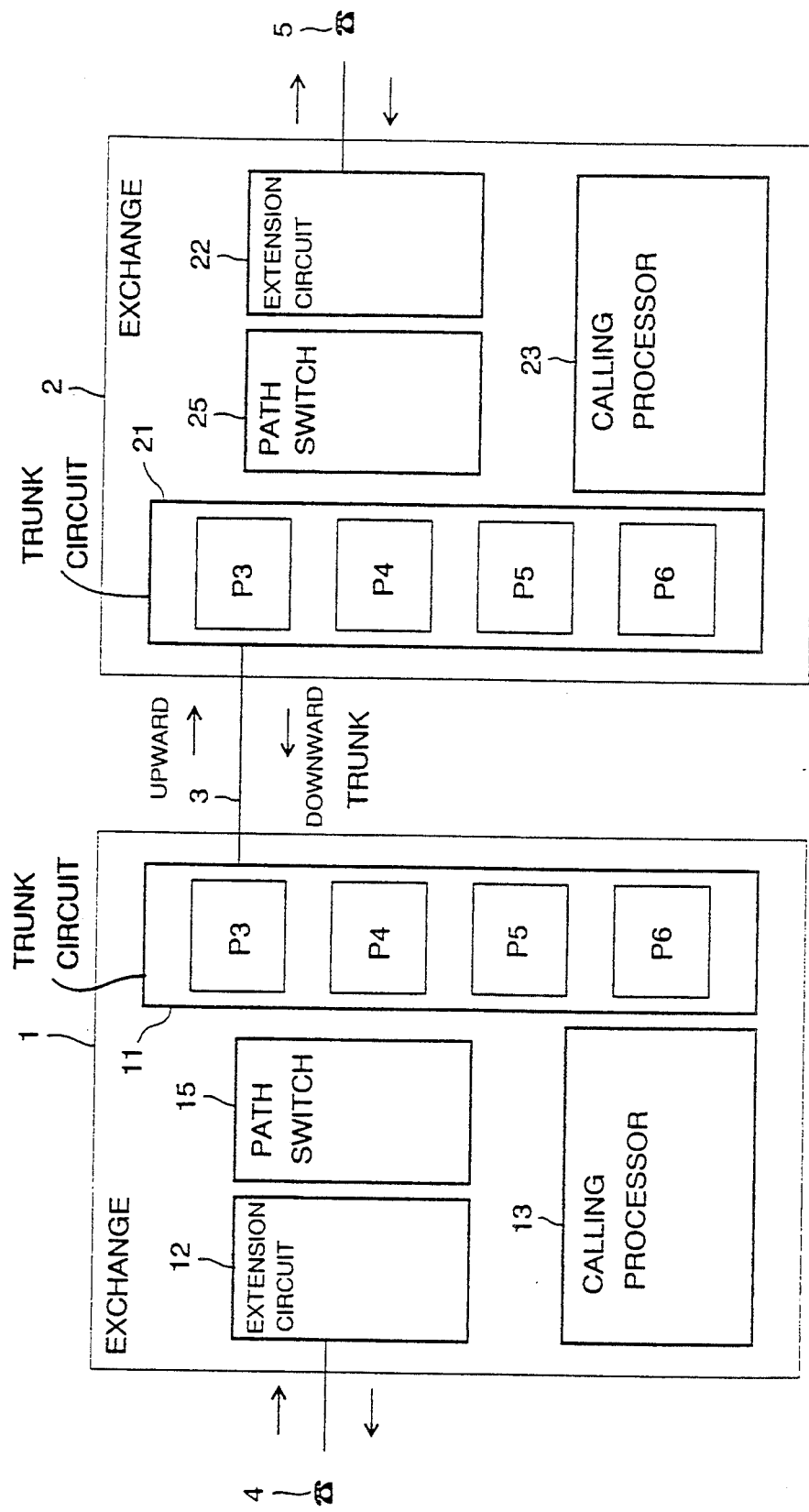
FIG. 4 is a block diagram illustrating an outline of a construction of a network system adopting inter-node control in a first embodiment of this invention.

FIG. 4 illustrates a configuration of a first embodiment in terms of principle of a network system adopting the inter-node control according to the present invention.

The network system shown in FIG. 4 is equipped with exchanges 1, 2, a trunk 3 and terminals 4, 5. The exchange 1 is linked via the trunk 3 to the exchange 2. The terminals 4, 5 are Connected to the exchanges 1, 2, respectively.

The exchange 1 includes a trunk circuit 11, an extension circuit 12, a calling processor 13 and a path switch 15. The exchange 2 includes a trunk circuit 21, an extension circuit 22, a calling processor 23 and a path switch 25.

The trunk circuits 11, 21 connect respective channels of the trunk 3 to the path switches 15, 25. The extension circuits 12, 22 are connected to the terminals 4, 5, respectively. The calling processors 13, 23 control the respective elements within the exchanges 1, 2.

In the system of FIG. 4, control information on an operational management maintenance between the exchanges 1, 2 is transmitted and received via the following route:

Calling processor 13—Trunk Circuit (i)—Trunk (i)—Trunk Circuit (i)—Calling Processor 23 where (i) implies an arbitrary trunk circuit and trunk as well, and no specific private channel is employed. Note that a control line between the trunk circuit and the calling processor may involve, though not particularly explained in detail, "the use of a specific time slot in the path switch" or "the provision of a physical bus".

In this case, the control information on a connection of the trunk between the exchanges 1, 2 is transmitted and received in the following manner.

That is, the calling processors 13, 23 transmit and receive the control information necessary for connecting, e.g., the terminal 4 to the terminal 5 on the following route, thus completing an inter-node connection between the terminals 4, 5.

Calling processor 13—Trunk Circuit 11—Trunk 3—Trunk Circuit 21—Calling processor 23

Turning to, e.g., FIG. 4, the terminal initiates a call and requests the exchange 1 for a connection to the terminal 5. In this case, the inter-node connection (trunk connection) is conducted. The following is a process of connecting the channel between the terminals 4, 5 in the inter-node connection in this instance.

The terminal 4 initiates the call, and the exchange 1 secures the trunk 3. The exchange 2 alerts the terminal 5. During this period, i.e., before a response from to the terminal 5, an upward/downward service band of the relevant channel of the trunk 3 is fundamentally unused.

Under such circumstances, according to the present invention, paying attention to such characteristics, the upward/downward service band of the relevant channel of the trunk 3 is employed for transmitting and receiving the control information till the remote party makes a response.

Further, the control information till the service is ended after receiving the response from the remote part is transmitted and received. On this occasion, the arrangement is that the control information can be transferred and received by exploiting continuous pieces of information indicating a silent status (or do-nothing communications status) during mutual services (or during data communications) between the terminals 4, 5.

Figure 5:
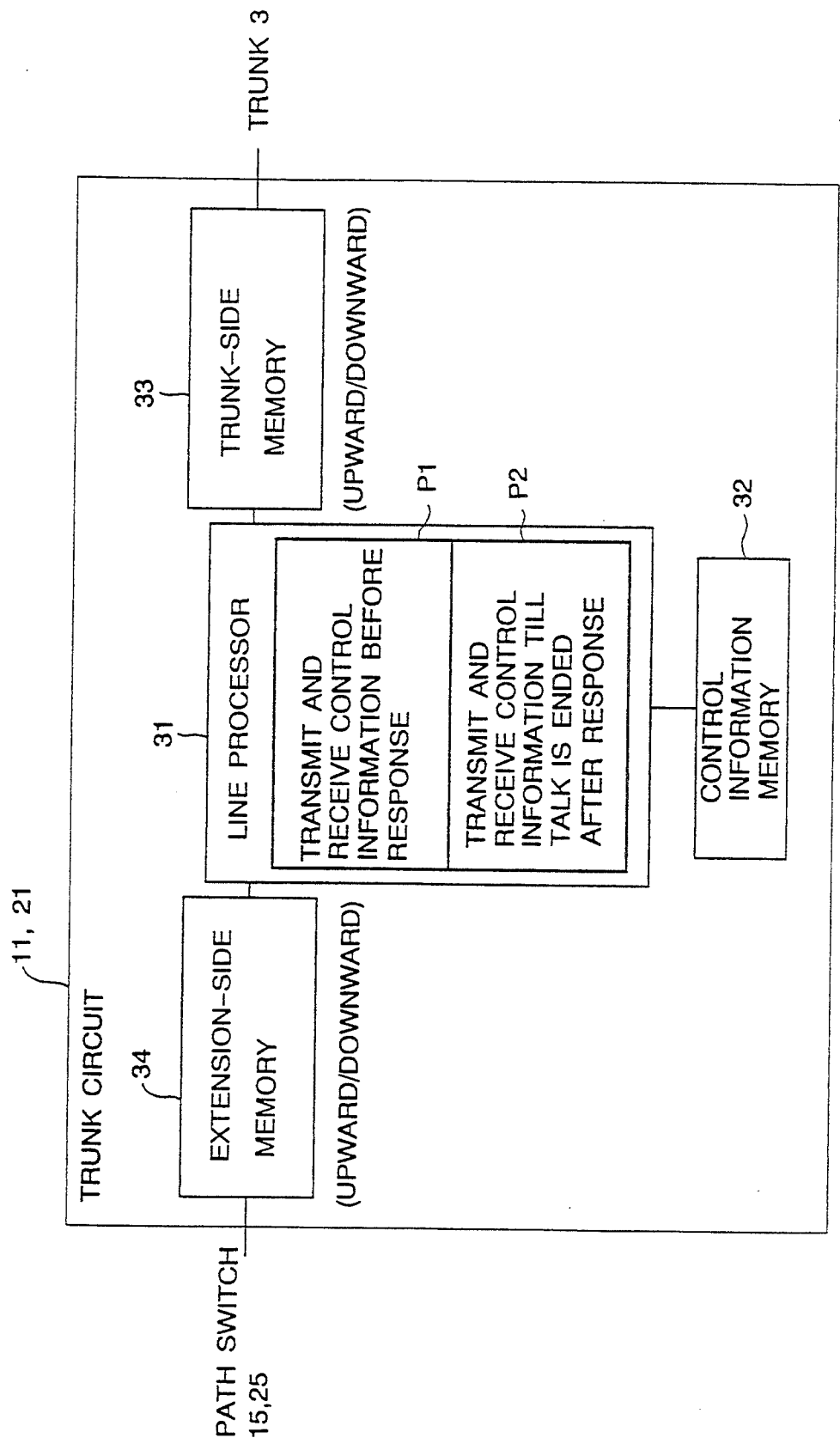
FIG. 5 is an explanatory block diagram showing a detailed configuration of a trunk circuit in terms of principle in the system of FIG. 4.

FIG. 5 specifically illustrates a configuration of the trunk circuit in terms of principle in the system of FIG. 4. Shown also is the configuration relative to the transmitting/receiving process of the control information within the trunk circuit 11 or 21 illustrated in FIG. 4.

The trunk circuit of FIG. 5 includes a line processor 31, a control information memory 32, a trunk-side memory 33 and an extension-side memory 34.

The line processor 31 performs processing of the circuit connection. The control information memory 32 stores pieces of information for control. The circuit memory 33 temporarily retains the information to be transmitted and received from the trunk. The extension-side memory 34 temporarily retains the information to be transmitted and received from the terminal.

The line processor 31 within the trunk circuit 11 or 21 transfers and receives the control information with respect to the calling processor via the control information memory 32. The line processor 31 also transmits and receives voice information (or communications information) and the control information to and from the trunk 3 (and further a trunk circuit of the remote party) via the circuit memory 33. The line processor 31 further transmits and receives the voice information with respect to the path switch (and further the extension circuit) via the extension-side memory 34.

The respective line processors within the trunk circuits 11, 21 transmit and receive the exchange-to-exchange control information of the exchanges 1, 2 between the line processors within the respective trunk circuits. This is done by a transmitting/receiving process P1 of the control information till the response is made and a transmitting/receiving process P2 of the control information till the service is ended after the response.

Figure 6:
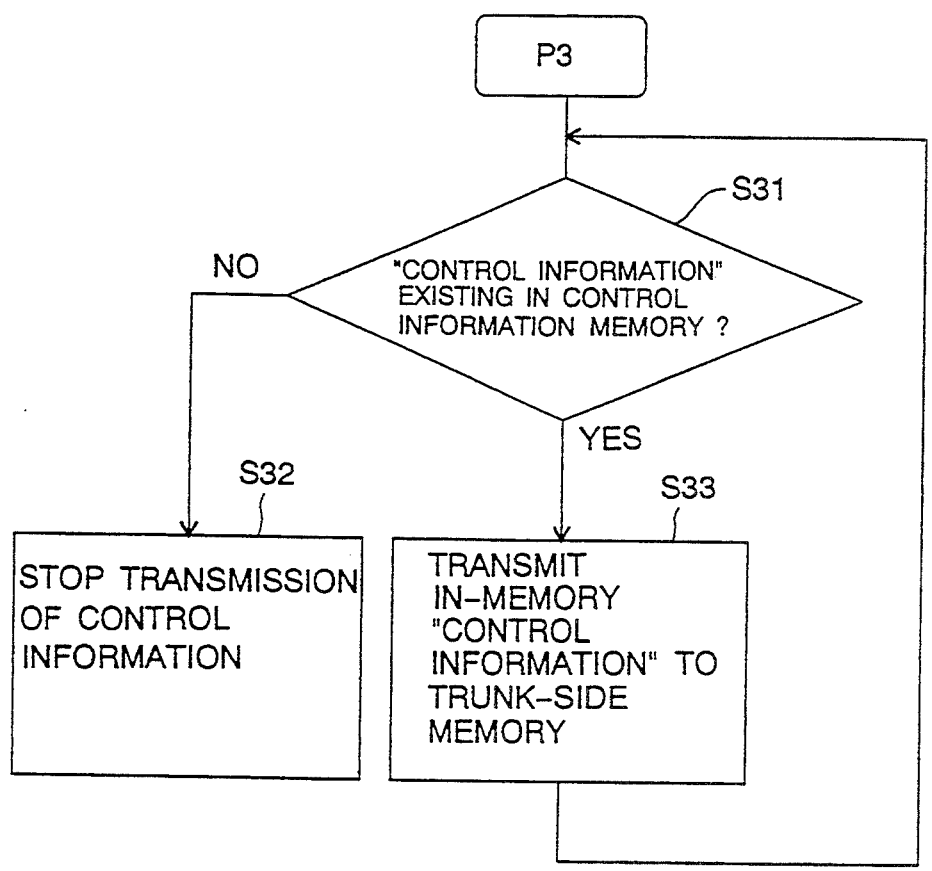
FIG. 6 is an explanatory flowchart showing operations on a transmitting side till a response is received in the system of FIG. 4.
Figure 7:
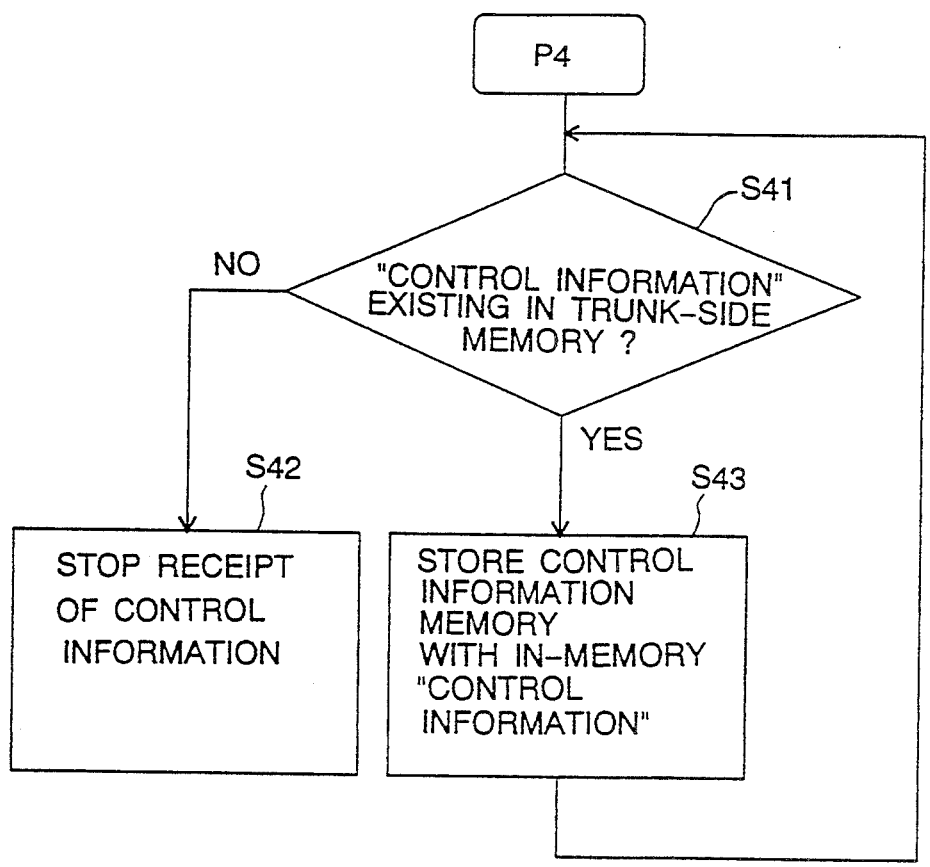
FIG. 7 is an explanatory flowchart showing operations on a receiving side till the response is received in the system of FIG. 4.

The transmitting/receiving process P1 of the control information before the response includes a transmitting process P3 shown in FIG. 6 and a receiving process P4 shown in FIG. 7.

The transmitting process P3 shown in FIG. 6 is a process effected by each line processor in the trunk circuits 11, 21. In this transmitting process P3, each line processor transmits, when the control information exists in the control information memory (steps S31, S32), the control information of its own to the line processor of the remote party (step S33).

The receiving process P4 shown in FIG. 7 is a process performed by each line processor in the trunk circuits 11, 21. In this receiving process P4, each line processor receives, when the control information exists in the circuit memory (steps S41, S42), the control information transmitted by the line processor of the remote party (step S43).

Figure 8:
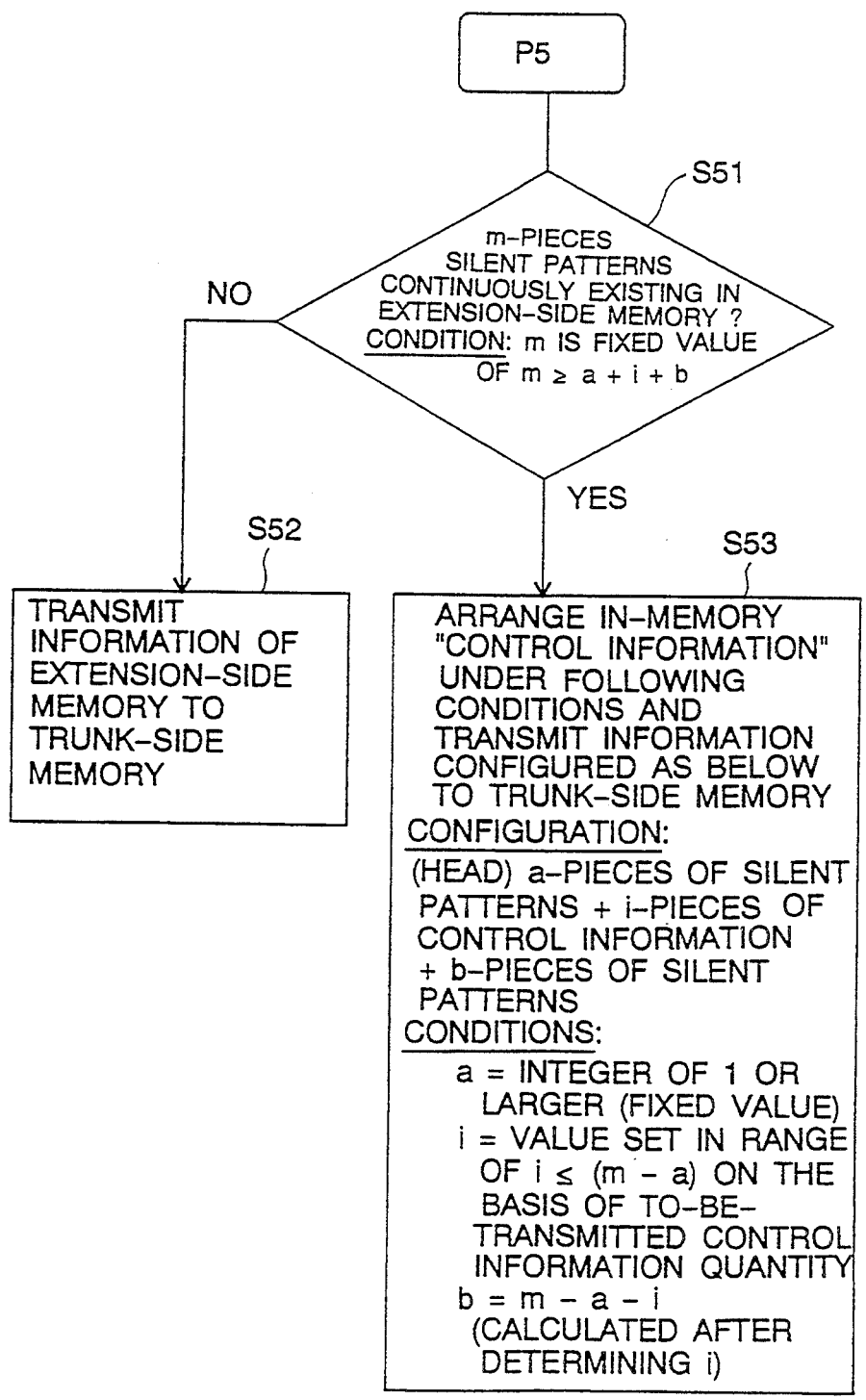
FIG. 8 is an explanatory flowchart showing operations on the transmitting side after receiving the response in the system of FIG. 4.
Figure 9:
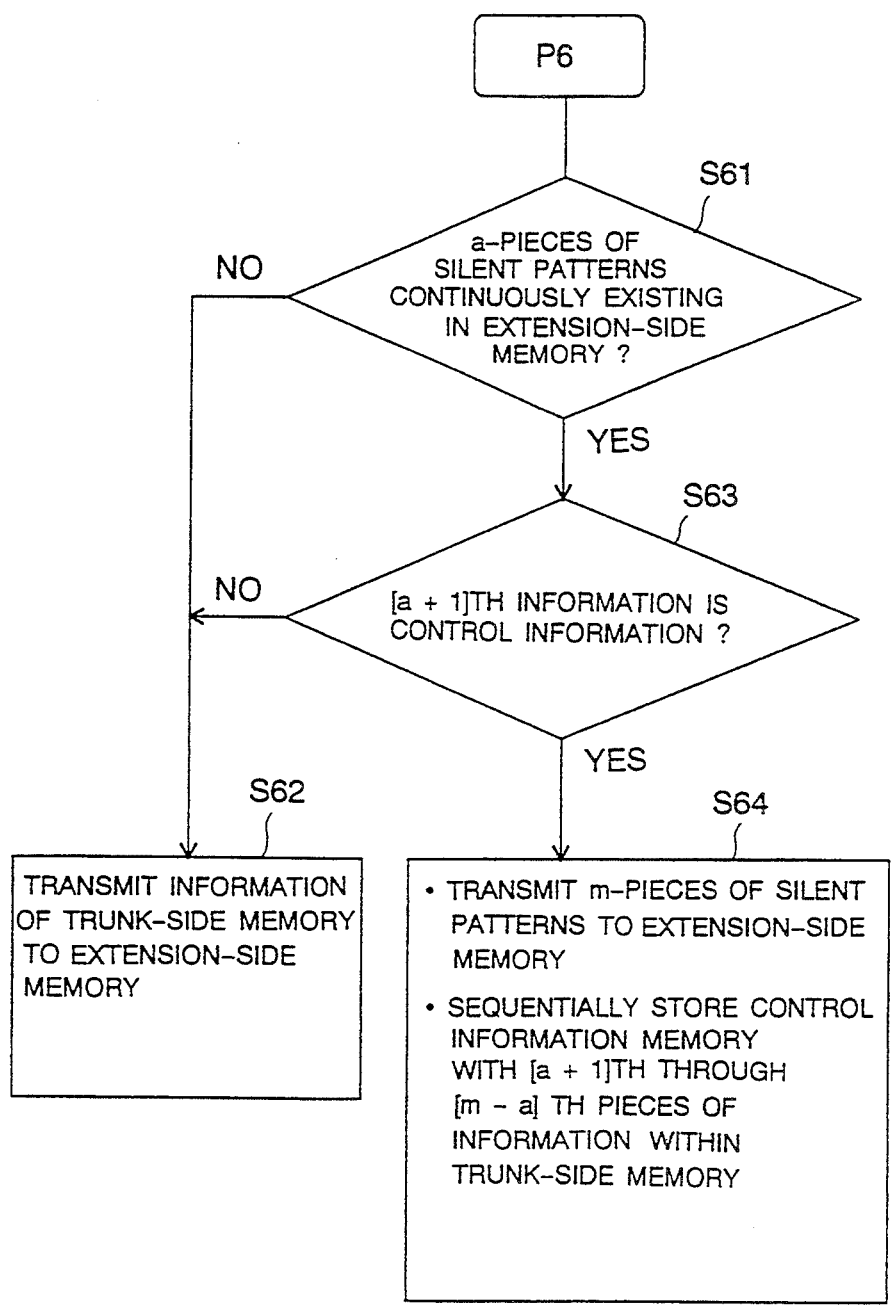
FIG. 9 is an explanatory flowchart showing operations on the receiving side after receiving the response in the system of FIG. 4.

The transmitting/receiving process P2, performed by the line processor 31 of FIG. 5, of the control information till the service is ended after the response includes a control information insert process P5 shown in FIG. 8 and a control information fetching process P6 shown in FIG. 9.

The control information insert process P5 illustrated in FIG. 8 is a process conducted by the line processors in the trunk circuits 11, 21. In this process P5, each line processor inserts the control information of its own into continuous silent patterns, thus transmitting the information to the line processor of the remote party.

Note that if the communications information between the terminals 4, 5 is not voice service information but is associated with data communications, e.g., a flag pattern of ADCCP (Advanced Data-Communications Control Procedures) in HDLC (Higher Data Link Control) (ANSI (American National Standards Institute)) in conformity with a recommendation of ISO (International Organization for Standardization) can be processed in the form of information implying do-nothing communications in place of the silent pattern as in the same way with the voices.

The control fetching process P6 shown in FIG. 9 is a process executed by the line processors in the trunk circuits 11, 21. This process P6 is such that each line processor receives the silent pattern plus the control information plus the silent pattern which have been line processor of the remote party; and only the control information is fetched out of these items of information. This process P6 further includes a process of transmitting the silent pattern to the terminal.

In this case also, if the communications media between the terminals 4, 5 is associated with the data communications, e.g., the HDLC flag pattern can be similarly processed as a piece of information implying the do-nothing communications instead of the silent pattern.

In the control information insert process P5 shown in FIG. 8, when a predetermined number m of silent patterns continuously exist in the extension-side memory 34 (steps S51, S52), i-pieces of silent patterns after a predetermined number a of silent patterns from the head thereof are replaced with i-pieces of control information within the control information memory 32 (step S53). The result is transmitted to the circuit memory 33. In the control information fetching process P6 shown in FIG. 9, when a predetermined number a of silent patterns continuously exist in the circuit memory 33 (steps S61, S62), and if the (a+1)th piece of information is defined as control information (steps S63, S62), the (a+1)th through (m−a)th pieces of information are fetched and stored in the control information memory 32. The same quantity of silent patterns as that of the information fetched are added to the former information (step S64). The added result is transmitted to the extension-side memory 34. The control information is thus transmitted and received by such processes. In this case, the quantity of the silent patterns does not change due to the insertion of the control information.

Figure 10:
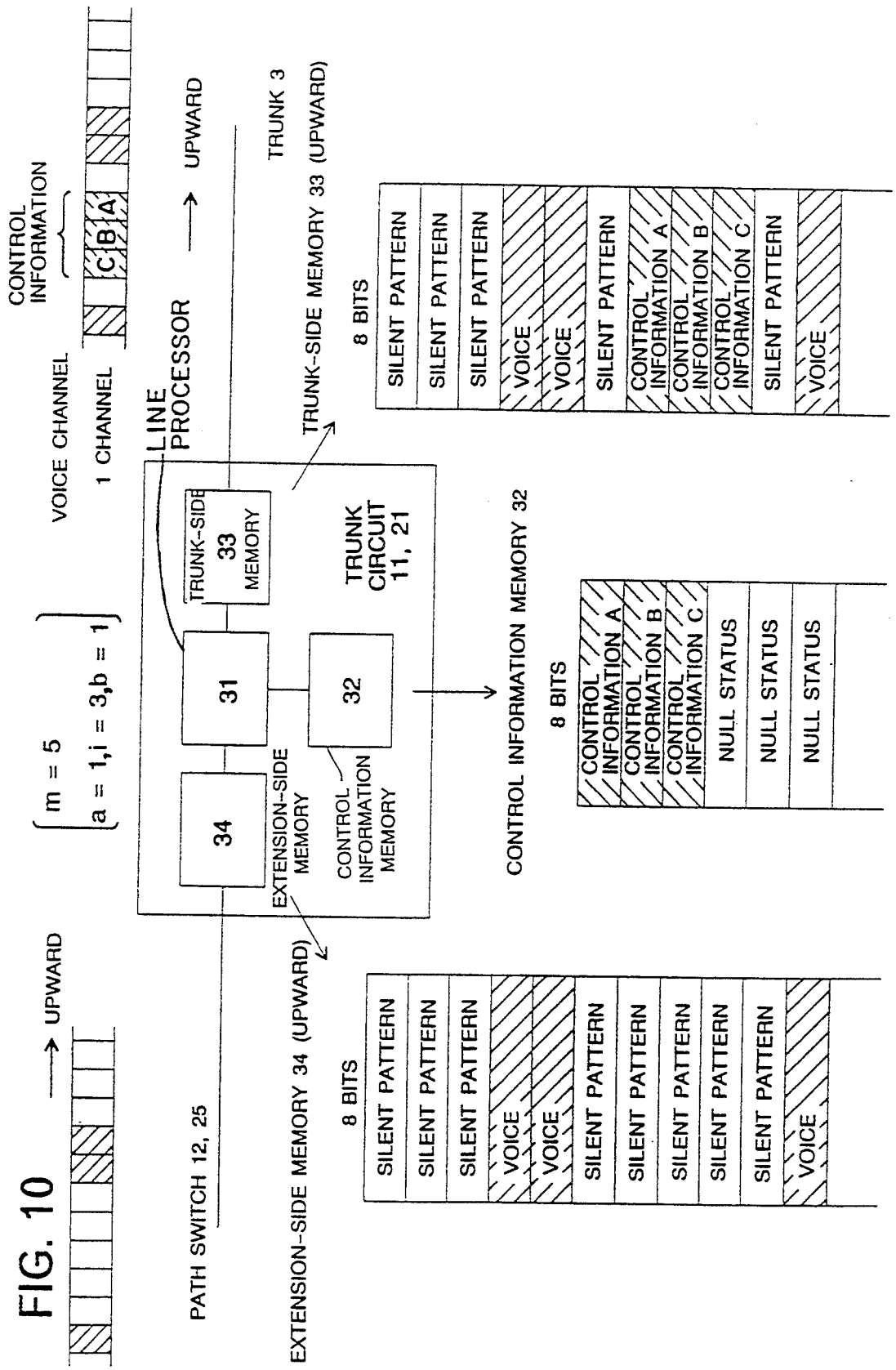
FIG. 10 is an explanatory schematic view showing operations on the transmitting side after receiving the response in the system of FIG. 4.
Figure 11:
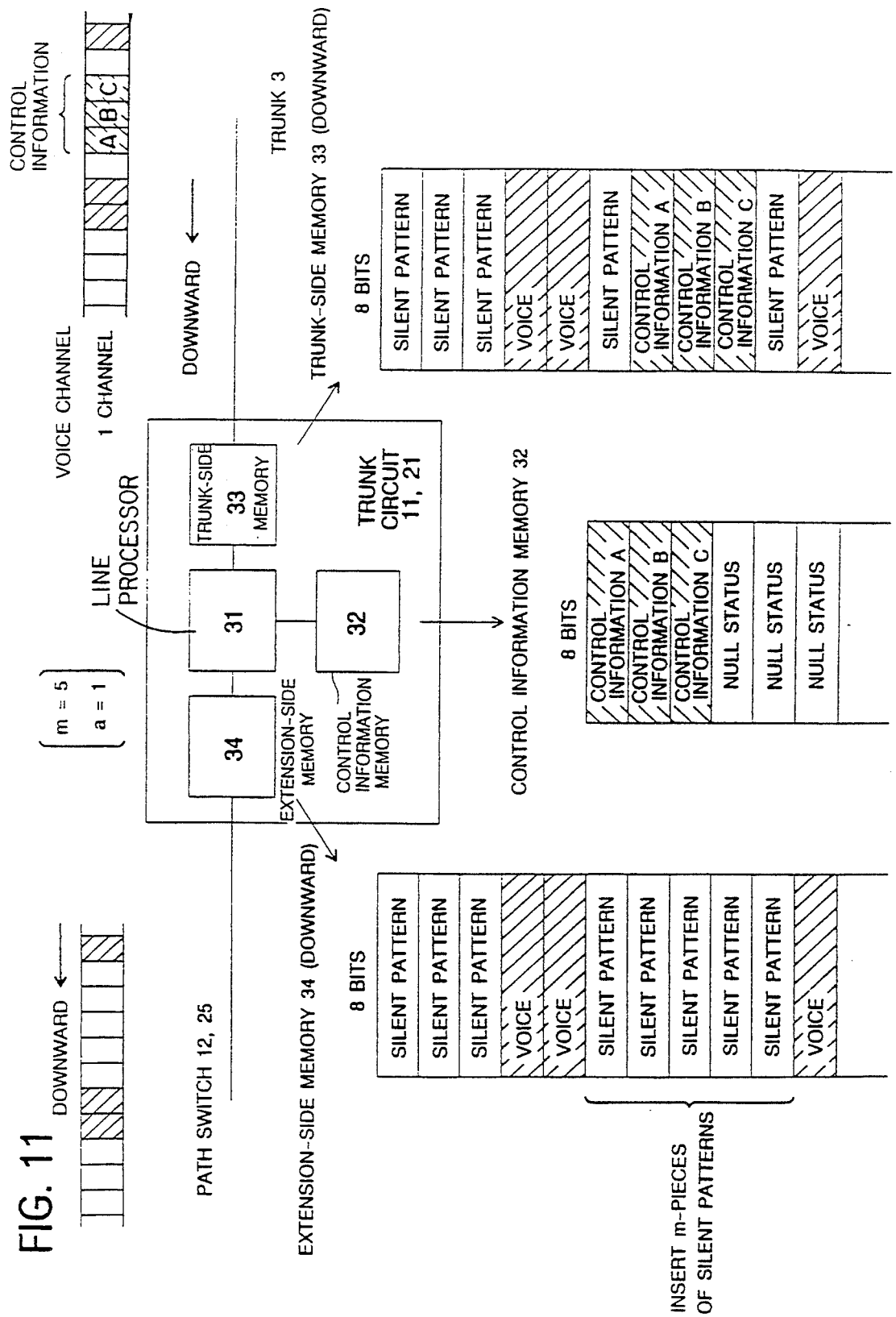
FIG. 11 is an schematic view showing operations on the receiving side after receiving the response in the system of FIG. 4.

FIGS. 10 and 11 schematically illustrate the processes in the above trunk circuits when transmitted and received in combination with a signal format and a memory storage format as well.

Further in the control information insert process P5, the predetermined number m of silent patterns continuously exist in the extension-side memory 34. In this case, the i-pieces of control information within the control information memory 32 are inserted after the predetermined number a of silent patterns which is counted from the head thereof. The inserted result is then transmitted to the extension-side memory 33. Subsequently, in the control information fetching process P6, when the predetermined number a of silent patterns continuously exist in the extension-side memory 33, and if the (a+1)th pieces of information is defined as the control information, the (a+1)th through (m−a+1)th pieces of information are fetched and stored in the control information memory 32. The same quantity of silent patterns as that of the information fetched are added to the former information. The added result is transmitted to the extension-side memory 34. The control information may be thus transmitted and received. In this instance, the quantity of the silent patterns increases because of the insertion of the control information. Incidentally, it is required in this case that the number i of pieces of control information inserted based on the control information insert process P5 be distinguished in the control information fetching process P6. The transmitting side can notify the receiving side of the number i of pieces of control information. On this occasion, the receiving side is simultaneously informed of a variation or non-variation in the quantity of silent patterns, thereby making it possible to distinguish which process to execute.

The system depicted in FIGS. 4 and 5 is capable of transmitting and receiving the control information on the trunk connection as well as on the operational management maintenance that are required by the exchanges 1, 2 for the inter-node control via the service channel of the service trunk in the manner described above.

Accordingly, in the conventional system based on the common-channel signalling, there is no necessity for preparing the private control channel needed for transmitting and receiving the control information between the nodes. In addition, each exchange does not have to be provided with the signalling processor. Namely, according to this system, it is possible to transmit and receive the control information equal to that in the conventional system of the common-channel signalling simply by using a corresponding number of trunks to the number of the service channels that is calculated based on the traffic.

Further, according to this system, the control information on the plurality of trunks can be transmitted and received by use of one arbitrary channel among the plurality of channels of the trunks.

In addition, according to this system, the exchange 1 selects, when transmitting the control information on the operational management maintenance to the exchange 2, an arbitrary trunk. The control information can be thereby transmitted and received via this trunk.

In this case, if a null trunk is selected, the control information is transmitted and received in the same way as that before making a response. Whereas if an in-service trunk is selected, the control information is transmitted and received in the same way as that till the communications are finished after the response.

[Embodiment 2]

Figure 12:
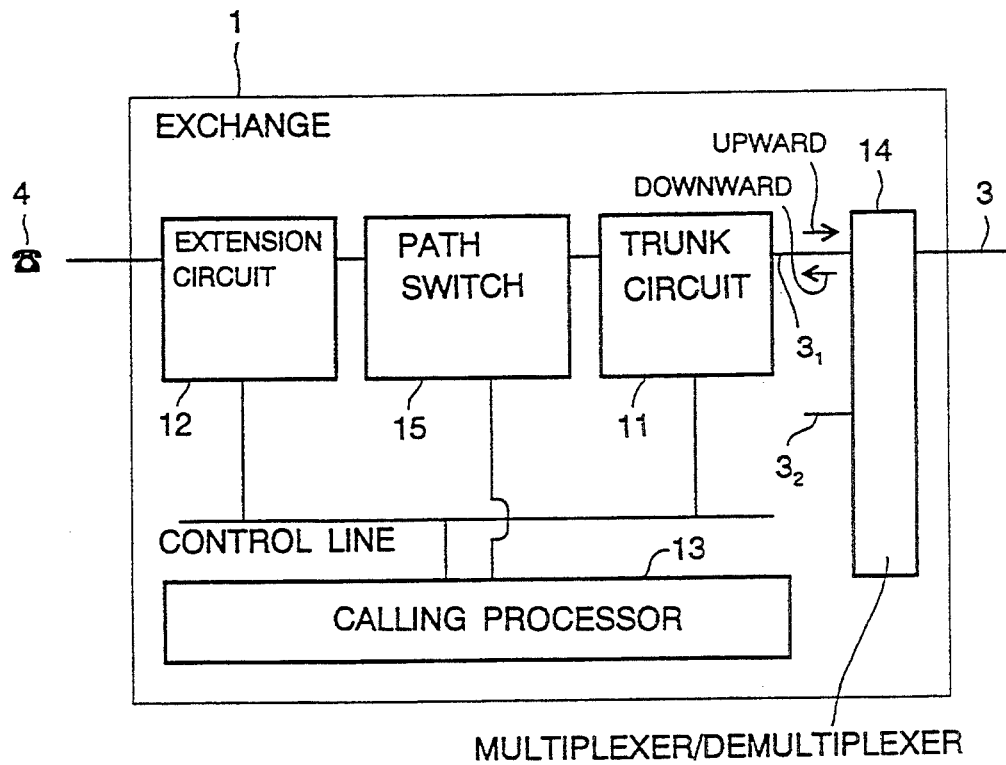
FIG. 12 is a block diagram illustrating a construction of the network system adopting the inter-node control in a second embodiment of this invention.
Figure 12:
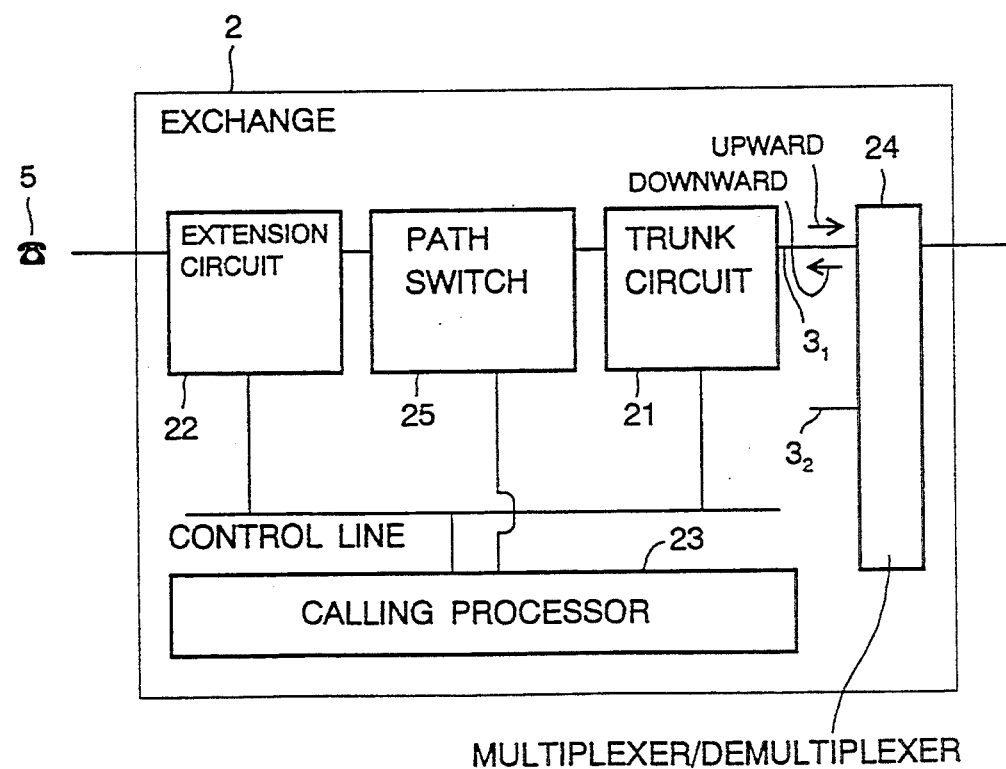

FIG. 12 is a block diagram illustrating a further specific construction of a second embodiment of the network system adopting the inter-node control according to this invention.

Referring to FIG. 12, the same elements as those in FIG. 4 are basically marked with the like numerals. Provided in this embodiment are trunks $3_1$, $3_2$, multiplexer/demultiplexers 14, 24 for multiplexing and demultiplexing, i.e., separating, signals between the plurality of trunks $3_1$, $3_2$ and the trunk 3 and also path switches 15, 25. The trunk 3 between the exchanges involves the use of a high-speed digital circuit (private line) of 128 Kbps.

Turning to FIG. 12, the trunk $3_1$ of the exchange 1 is connected to the trunk circuit 11. The trunk $3_2$ is connected to another trunk circuit (unillustrated) corresponding to the trunk $3_2$. The trunk $3_1$ of the exchange 2 is connected to the trunk circuit 21. The trunk $3_2$ is connected to another trunk circuit (unillustrated) corresponding to the trunk $3_2$.

Figure 13:
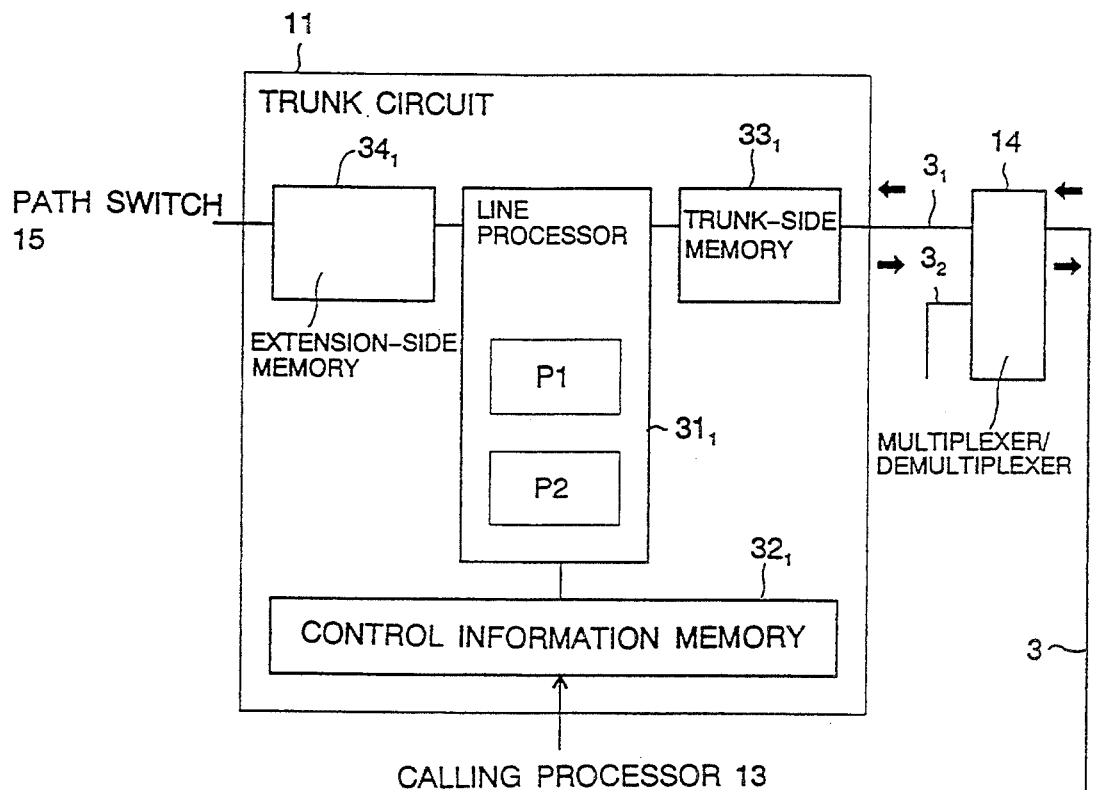
FIG. 13 is an explanatory block diagram showing a detailed configuration of the trunk circuit in terms of principle in the system of FIG. 12.
Figure 13:
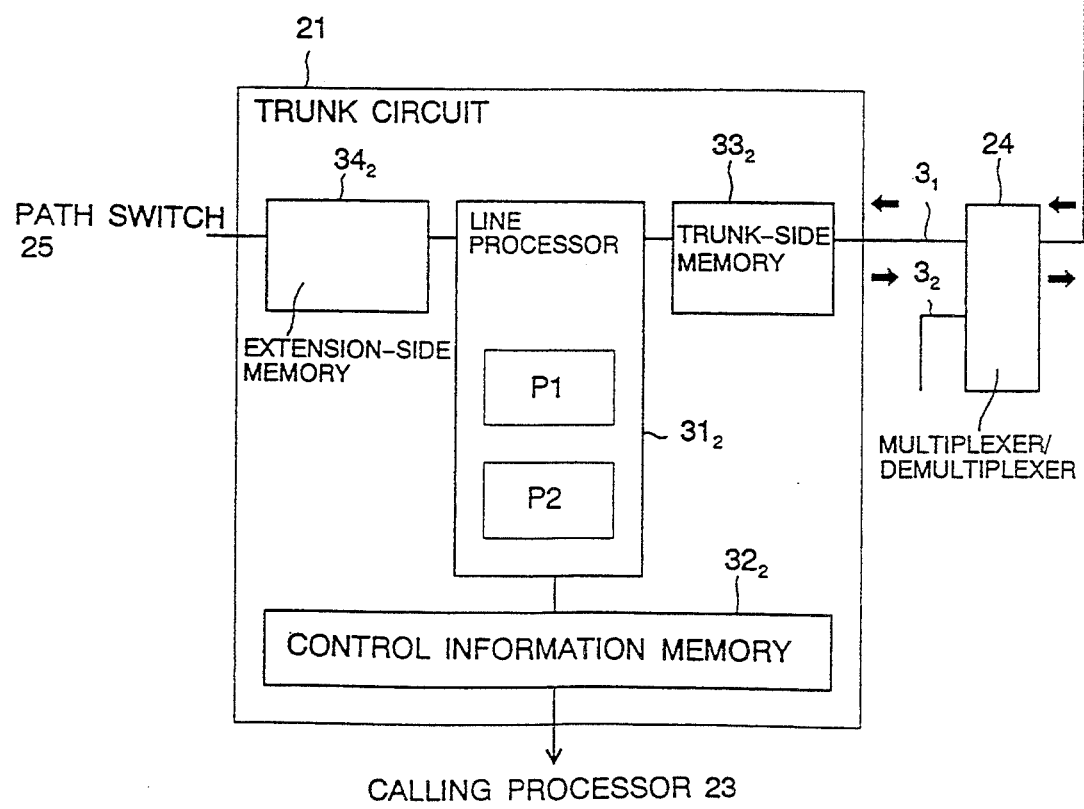

FIG. 13 illustrates a configuration in the trunk circuit in the system of FIG. 12. The same elements as those in FIG. 12 are basically marked with the like numerals.

Line processors $31_1$, $31_2$, control information memories $32_1$, $32_2$, trunk-side memories $33_1$, $33_2$ and extension-side memories $34_1$, $34_2$ correspond to the line processor 31, the control information memory 32, the trunk-side memory 33 and the extension-side memory 34 in FIG. 5. The suffix 1 corresponds to the trunk circuit 11, while the suffix 2 corresponds to the trunk circuit 21.

FIG. 13 illustrates a state where the trunk circuits 11, 21 are connected to each other in correspondence. shown therein are an upward transmitting/receiving process for sending the control information from the trunk circuit 11 toward the trunk circuit 21 and a downward transmitting/receiving process for sending the control information from the trunk circuit 21 towards the trunk circuit 11.

In this case also, according to the control information insert/fetching processes, the control information insert process in, e.g., the trunk circuit 11 is that when the predetermined number m of silent patterns continuously exist in the extension-side memory $34_1$, i-pieces of silent patterns after a predetermined number a of silent patterns from the head thereof are replaced with i-pieces of control information within the control information memory $32_1$, and the result is transmitted to the extension-side memory $33_1$. According to the control information fetching process in the trunk circuit 21, when the predetermined number a of silent patterns continuously exist in the circuit memory $33_2$, and if the (a+1)th piece of information is defined as the control information, the (a+1)th through (m−a)th pieces of control information are fetched and stored in the control information memory $32_2$. The same quantity of silent patterns as that of the control information fetched are added to the former information, and the result is transmitted to the extension-side memory $34_2$. The control information is thus transmitted and received. The quantity of the silent patterns does not change due to the insertion of the control information.

Further, according to the control information insert process in, e.g., the trunk circuit 11, when the predetermined number m of silent patterns continuously exist in the extension-side memory $34_1$, the i-pieces of control information in the control information memory $32_1$ are inserted after the predetermined number a of silent patterns from the head thereof, and the inserted result is transmitted to the circuit memory $33_1$. Then, according to the control information fetching process in the trunk circuit 21, when the predetermined number a of silent patterns continuously exist in the circuit memory $33_2$, and if the (a+1)th piece of information is defined as the control information, the (a+1)th through (m−a+1)th pieces of information are fetched and stored in the control information memory $32_2$. The same quantity of silent patterns as that of the information fetched are added to the former information. The added result is transmitted to the extension-side memory $34_2$. The control information may be thus transmitted and received. If done so, the quantity of the silent patterns increases due to the insertion of the control information.

Figure 14:
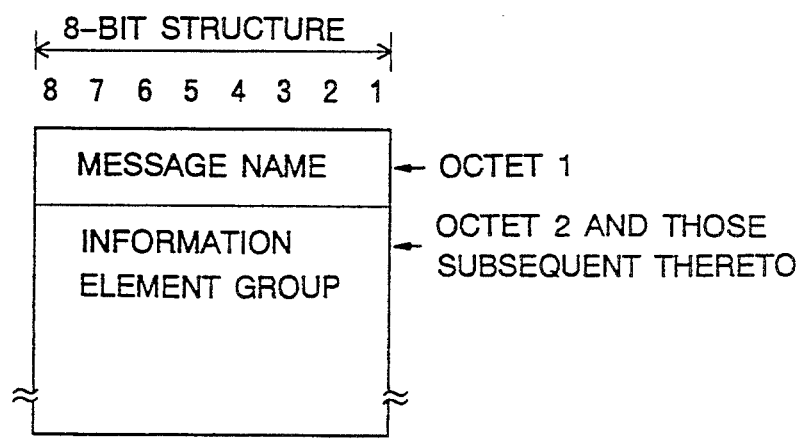
FIG. 14 is an explanatory view showing a basic message format of the control information in the system of FIG. 12.

FIG. 14 shows a basic structure of a message format of the "control information" in the system of FIG. 12.

Shown is an arrangement that a message name is provided in an octet 1, and subsequent octets including an octet 2 contain a group of information elements.

It is necessary for conditions of the basic structure of the message format to satisfy the following requirements. This enables the structure to be an object of the "control information" according to this invention.

<1> A message content by which the control information can be distinguished is contained in the octet 1.

<2> Information by which the number of octets of the information elements can be distinguished is contained in the subsequent octets including the octet 2.

Figure 15:
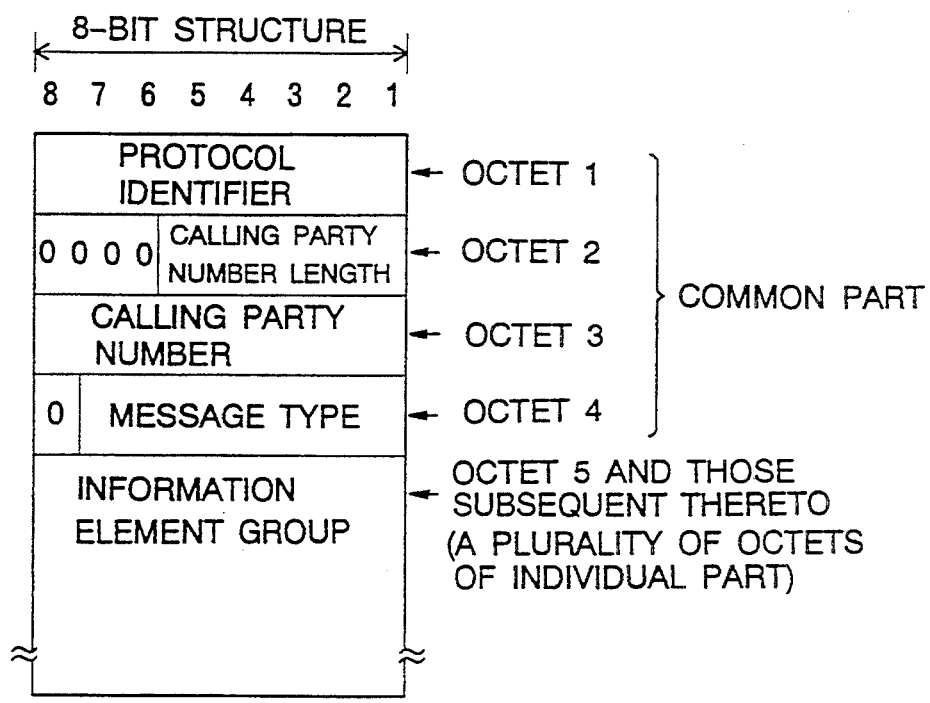
FIG. 15 is an explanatory view showing a further concrete message format of the control information of FIG. 14.

FIG. 15 concretely exemplifies the message format of the "control information" in the system of FIG. 12. A protocol identifier is set in the octet 1 serving as a common part. A call number length is set in the octet 2. A call number is set in an octet 3. A type of messages is set in an octet 4. Further, a group of information elements are disposed in a plurality of subsequent octets including an octet 5 that serve as an individual part. This information element group contains information on a variation in the quantity of the silent patterns described above and the number i of pieces of control information inserted in the silent patterns.

Note that the control information (messages) in this system should involve, in terms of its content, the use of control information (messages) pursuant to "D-channel protocol control information" of ISDN of CCITT.

Figure 16:
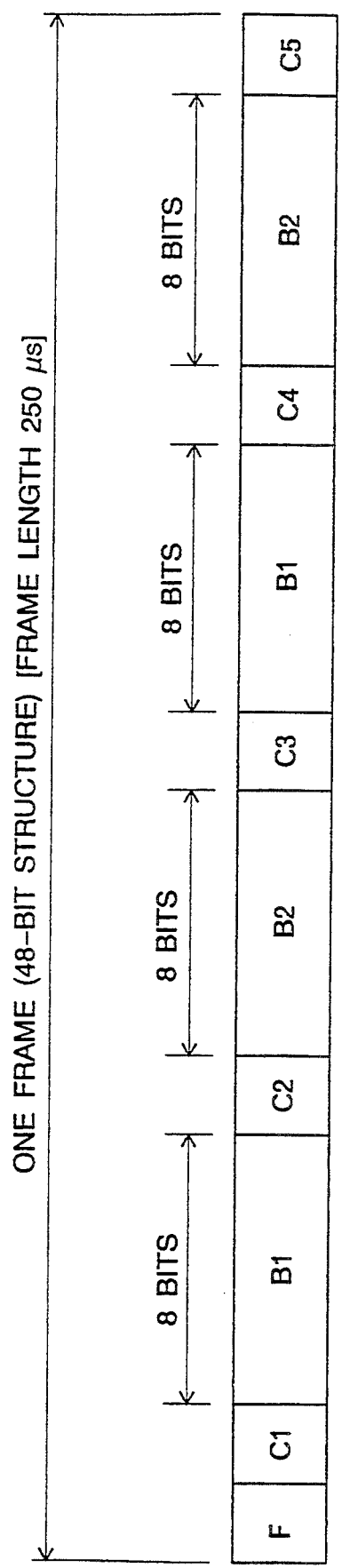
FIG. 16 is an explanatory view showing a frame format of the high-speed digital circuit in the system of FIG. 12.

FIG. 16 illustrates a frame configuration of the high-speed digital circuit (private line). In this system, the frame configuration is shown on the assumption that a high-speed digital circuit of 128 Kbps is employed as the trunk 3. One frame consists of 48 bits, and a frame length is on the order of 250 µs.

Referring to FIG. 16, a frame period bit F is 1 bit. A bit C1 is 1 bit, and a bit group C2 consists of 5 bits. Then, bit groups C3 to C5 each consist of 3 bits. These bits are bits for defining, e.g., the high-speed digital circuit with a layer 1, unused bits, multiframe period bits and others.

Note that the multiplexer/demultiplexers 14, 24 shown in FIG. 12 incorporate the following functions:

(1) Multiplex Function

The 8-bit information (service information and control information) transmitted from the circuit memories of the trunk circuit 11 and another trunk circuit is run on a B1 channel and a B2 channel in the frame illustrated in FIG. 16.

(2) Separation Function

The 8-bit information is fetched out of the B1 channel and the B2 channel in the frame of FIG. 16. The 8-bit information is then transmitted to the circuit memories of the trunk circuit 11 and another trunk circuit.

A low of processing in the system of FIG. 12 will hereinafter be explained. A prerequisite herein is that the control information is transmitted and received between the exchanges 1, 2 by use of messages of "Digital Interface Between PBXs (Common-Channel Signalling)-Layer 3" of TTC standard JT-Q931-a. Further, an explanation of contents of the control information (messages) of portions that are not particularly stated is omitted in the following discussion because of using the control information based on the common-circuit channel signalling.

I. Process when the terminal 4 initiates a call and connects with the terminal 5

The processing flow which follows indicates a case where the control information on the connection of an arbitrary trunk is transmitted and received by employing this trunk.

(1) The user of the terminal 4 in FIG. 12 effects offhook and initiates a call. Hereat, the extension circuit 12 detects this call initiated and notifies the calling processor 13 of this via the control line. The calling processor 13 instructs the extension circuit 12 to emit a dial tone via the control line. The extension circuit 12 transmits the dial tone to the terminal 4. The user of the terminal 4, after confirming the dial tone, dials a calling party number of the terminal 5.

(2) The extension circuit 12 receives this calling party number and informs the calling processor 13 of "calling party number information" via the control line.

(3) The calling processor 13 numerically analyzes this "calling party number information" and identifies it with "trunk connection" to the exchange 2.

[Call Outgoing-Side Process of Trunk Connection]

(Transmission of "Call Setting")

(4) The call processor 13 makes 1-channel selection of a null trunk from the trunks connected to the exchange 2 through this identification. In accordance with this embodiment, it is assumed that a trunk $3_1$ is selected.

(5) The call processor 13 instructs a line processor of the trunk circuit 11 which shows one-to-one correspondence to the trunk $3_1$ to effect "trunk call outgoing" via the control line. A "call setting (SETUP)" message is stored in the control information memory of the trunk circuit 11. As a content of the "call setting (SETUP)" message, information required for the trunk connection is set by the calling processor 13.

Incidentally, the processes rated above implies that the control information on the connection relative to the trunk $3_1$ is transmitted and received via the trunk $3_1$. Further, according to this invention, the control information on the connection of, e.g., a trunk $3_2$ can be also transmitted and received via the trunk $3_1$. In this case, not "trunk call outgoing" but "transmission of control information" is instructed, whereby the control information of the trunk $3_2$ can be transmitted and received.

(6) The line processor of the trunk circuit 11 transmits the control information within the control information memory, i.e., the "call setting (SETUP)" message to the line processor of the corresponding trunk circuit 21 via the upward channel of the trunk 3 according to the instruction of "trunk call outgoing". The transmitting process in this instance is performed in accordance with the transmitting process flowchart of FIG. 6 on the basis of the configuration of FIG. 13. In the process of FIG. 16, a judgement of being "control information" is made based on a value of the protocol identifier in the "call setting (SETUP)" message. Note that on this occasion the upward channel of the trunk $3_1$ does not yet come into service, and, therefore, a band on the order of 64 Kbps is fully available.

(7) The call setting (SETUP) message transferred to the circuit memory by the process shown in the processing flow of FIG. 6 is sequentially transmitted 8-bit-wise to the multiplexer/demultiplexer 14.

(8) The multiplexer/demultiplexer 14 sequentially multiplexes the control information transferred from the trunk circuit 11 to the B1 channel or B2 channel in the frame configuration shown in FIG. 16. It is hereinafter assumed in this embodiment that this control information runs on the B1 channel. The multiplexer/demultiplexer 14 sequentially transmits bit strings shown in the frame configuration of FIG. 16 to the high-speed digital circuit.

[Incoming-Side Process of Trunk Connection]
(Send-Back of "Receipt of Call Setting" and "Acceptance of Call Setting" and Calling of Terminal 5)

(9) The multiplexer/demultiplexer 24 of the exchange 2 receives these bit-strings in sequence from the high-speed digital circuit. The multiplexer/demultiplexer 24 separates and fetches the B1 channel information out of the frame. The circuit 24 sequentially transmits the B1 channel information to the circuit memory of the trunk circuit 21. The circuit memory stores these pieces of information in sequence.

(10) The line processor of the trunk circuit 21 identifies the information stored in the circuit memory in accordance with the receiving process flowchart shown in FIG. 7. More specifically, the line processor judges that the control information exists on the basis of a value of the protocol identifier contained in the message. The information within the circuit memory is stored in the control information memory.

(11) The line processor of the trunk circuit 21 transmits, to the calling processor 23, the control information within the control information memory, i.e., the "call setting (SETUP)" message.

(12) The calling processor 23 makes an identification of being "trunk incoming" by analyzing the "call setting (SETUP)" message. The action is then shifted to a trunk incoming process. Namely:

1) The "call setting acceptance" message is sent back to the line processor of the remote party. This is done by processes of the following terms (13) to (20).

2) The action is shifted to the calling process of the terminal 5 on the basis of a called party number of the "call setting (SETUP)" message. This is done by processes of terms (21) to (22) which will be stated later.

(13) The calling processor 23 causes the control information memory of the trunk circuit 21 to store the "call setting acceptance" message via the control line. The processor 23 instructs the line processor of the trunk circuit 21 to send back the "call setting acceptance".

(14) The line processor of the trunk circuit 21 sends back, when receiving this instruction, the control information within the control information memory, viz., the "call setting acceptance" message to the line processor of the trunk circuit 11 via the downward channel of the trunk $3_1$. The send-back process in this case is conducted in accordance with the transmitting process flowchart shown in FIG. 6. It is judged that the "control information" exists according to a value of the protocol identifier of this message in the transmitting process of FIG. 6. On this occasion, the downward route of the trunk $3_1$ does not yet come into service, and hence the band on the order of 64 Kbps is fully available.

(15) The "call setting acceptance" message transferred to the circuit memory by the process shown in FIG. 6 is sequentially transmitted 8-bitwise to the multiplexer/demultiplexer 24.

(16) The multiplexer/demultiplexer 24 sequentially transmits the control information given from the trunk circuit 21 to the B1 channel in the frame shown in FIG. 16. The multiplexer/demultiplexer 24 sequentially transmits the bit-strings in the frame configuration illustrated in FIG. 16 to the high-speed digital circuit of the trunk 3.

(17) The multiplexer/demultiplexer 14 of the exchange 1 sequentially receives these bit-strings from the high-speed digital circuit. The circuit 14 then separates and fetches the information of the B1 channel out of the frame. The multiplexer/demultiplexer 14 sequentially transmits the separated B1 channel information to the circuit memory of the trunk circuit 11. The circuit memory stores these pieces of B1 channel information in sequence.

(18) The line processor of the trunk circuit 11 identifies the information stored in the circuit memory in accordance with the receiving process flowchart shown in FIG. 7. The line processor judges that the "control information" exists on the basis of a value of the protocol identifier of this message. The intra circuit memory information is stored in the control information memory.

(19) The line processor of the trunk circuit 11 transmits the information within the control information memory, videlicet, the "call setting acceptance" message to the calling processor 13 via the control line.

(20) The calling processor 13 confirms that the "call setting (SETUP)" message transmitted at first is received by the line processor of the remote party by analyzing the "call setting acceptance" message. The processor 13 stops the transmission of call setting messages after that message.

[Calling Process of Terminal 5]
(Calling Process and Transmission of "Calling" Message)

(21) The calling processor 23 identifies an extension circuit 22 accommodating the terminal 5 by analyzing the called party number of the "call setting (SETUP)", and the action shifts to the calling process.

1) Calling of the terminal 5 is effected. This is done by a process of the next term (22).

2) A notice of being in a calling status is sent back to the processor of the remote party. This is done by processes of terms (22) to (25) which will hereinafter be mentioned.

(22) The calling processor 23 instructs the extension circuit 22 to effect "calling" via the control line. The extension circuit 22 transmits, when receiving this instruction, a calling signal to an extension and perform calling of the terminal 5.

(23) The calling processor 23 causes the control information memory of the trunk circuit 21 to store a "calling" message via the control line. The processor 23 instructs the line processor of the trunk circuit 21 to transmit the "calling" message.

(24) This "calling" message is, when "call setting acceptance" is read for "calling" with the result that the same processes as those from the term (14) to the term (19) described above, transferred to the control information memory of the trunk circuit 11 from the control information memory of the trunk circuit 21.

(25) The calling processor 13 makes an identification of being the "calling" message by analyzing the control information transmitted from the line processor of the trunk circuit 11. Based on this identified result, the processor 13 instructs the extension circuit 12 to transmit a dial tone via the control line. The extension circuit 12 transmits the dial tone to the terminal 4.

[Response, Service Process]
(Transmission of "Response", Send-Back of "Response Confirmation", Connection of Channel)

(26) On the other hand, the user of the terminal 5 who has received the call effects off-hook and responds thereto. The extension circuit 22 transmits "response information" relative to this response to the calling processor 23 via the control line.

(27) The calling processor 23 causes the control information memory of the trunk circuit 21 to store a "response" message via the control line. The processor 23 instructs the line processor of the trunk circuit 21 to transmit the "response" message.

(28) This "response" message is, when "call setting acceptance" is read for "response" with the result that the same processes as those of the terms (14) to (19) stated above, transferred to the control information memory of the transmit line circuit 11 from the control information memory of the trunk circuit 21.

(29) The calling processor 13 makes an identification of being "response" message by analyzing this control information transmitted from the line processor of the trunk circuit 11. Based on this identification, the processor 13 instructs the extension circuit 12 to stop the transmission of the dial tone via the control line. The extension circuit 12 thereby stops the transmission of the dial tone.

(30) Further, the calling processor 13 causes the control information memory of the trunk circuit 11 to store a "response confirmation" message via the control line. The processor 13 instructs the line processor of the trunk circuit 11 to send back the "response confirmation" message.

(31) This "response confirmation" message is, when "call setting" is read for "response confirmation" with the result that the same processes as those in the above terms (6) to (11), transferred to the control information memory of the trunk circuit 21 from the control information memory of the trunk circuit 11. The line processor of the trunk circuit 11 transmits the "transmission confirmation" message to the circuit memory. The processor thereafter notifies the calling processor 13 of the control information of a "completed transmission of response confirmation message" via the control line.

(32) The calling processor 23 connects the upward/downward channels of the next route after receiving the "response confirmation" message.

Channel Route=Extension Circuit 22
Path Switch 25
Trunk Circuit 21
Trunk 3

Further, the calling processor 13 connects the upward/downward channels of the next route after receiving the "completed transmission of response confirmation message".

Channel Route=Extension Circuit 12
Path Switch 15
Trunk Circuit 11
Trunk 3

(33) The terminal 4 accommodated in the exchange 1 can connect with the terminal 5 accommodated in the exchange 2 by the processes given above.

II. Transmitting/Receiving Process of Control Information on Connection Call for Plural Transit Lines Shown in the following processing flow is a case where the control information on the connection call for the plurality of trunks is transmitted and received via an arbitrary 1-channel trunk.

(1) For instance, when the calling processor 13 is executing the transmitting/receiving process of the control information on the above trunk $3_1$, it is assumed that a new trunk connection through the trunk $3_2$ takes place.

(2) The calling processors 13, 23 perform the transmitting/receiving process of the control information on the connection of the trunk $3_2$ in the same way as the process of the term 1 described above. The calling processors 13, 23, however, execute the call-connection by discriminating whether the information is the control information of the trunk $3_1$ or $3_2$ on the basis of information on "calling party number" in the messages of the respective items of control information as shown in FIG. 15.

That is, each line processor of the trunk circuits 11, 21 transfers the control information transmitted from the calling processor to the remote party without seeing the content thereof by the processes shown in FIGS. 6, 7 and is therefore capable of performing the above-mentioned process.

III. Transmitting/Receiving Process of Control Information of Operational Management Maintenance between Exchanges 1 and 2

Shown in the following processing flow is a case where the control information of "operational management maintenance" is transmitted and received between the exchanges 1, 2 by use of an arbitrary 1 channel trunk.

(1) The calling processor 13 executes, when including the control information of "operational management maintenance" that is to be transferred to the calling processor 23, the transmitting/receiving process of this control information in the same way as the process of the term 1. A message for carrying this control information involves the use of the "call setting" message and the "call setting acceptance" message for replying, thereby transmitting and receiving this control information. Further, the control information is transferable by using even some messages other than the above-mentioned on condition that a message format for the control information as shown in FIG. 14 is settled.

IV. Transmitting/Receiving Process by Employing In-Service Trunk

Shown in the following processing flow is a case where an arbitrary item of control information (hereinafter termed "α control information") is transmitted and received via an arbitrary in-service trunk. Note that the α control information is configured the same as the message format shown in FIG. 15 and may be enough if it satisfies the basic structure of FIG. 14.

The α control information is transmitted and received in the following cases.

1) A case where the calling processor 13 transmits and receives the control information on the connection call relative to the in-service trunk $3_1$ to and from the calling processor 23 by use of the trunk 3.

2) A case where the calling processor 13 transmits and receives the control information on the connection call relative to the trunk $3_2$ to and from the calling processor 23 by use of the in-service trunk $3_1$.

3) A case where the calling processor 13 transmits and receives the control information on the operational management maintenance between the exchanges 1, 2 to and from the calling processor 23 by use of the in-service trunk $3_1$.

(1) The calling processor effects 1-channel selection of an in-service trunk. It is presumed in this embodiment that the trunk $3_1$ is selected. Incidentally, herein, for a supplementary explanation, a processing action of the trunk circuits 11, 21 of in-service trunk $3_1$ is such that the extension- and trunk-side memories of the trunk circuits 11, 21 transfer the service information between the terminals 4, 5 in response to a transfer instruction of each line processor.

Figure 17A:
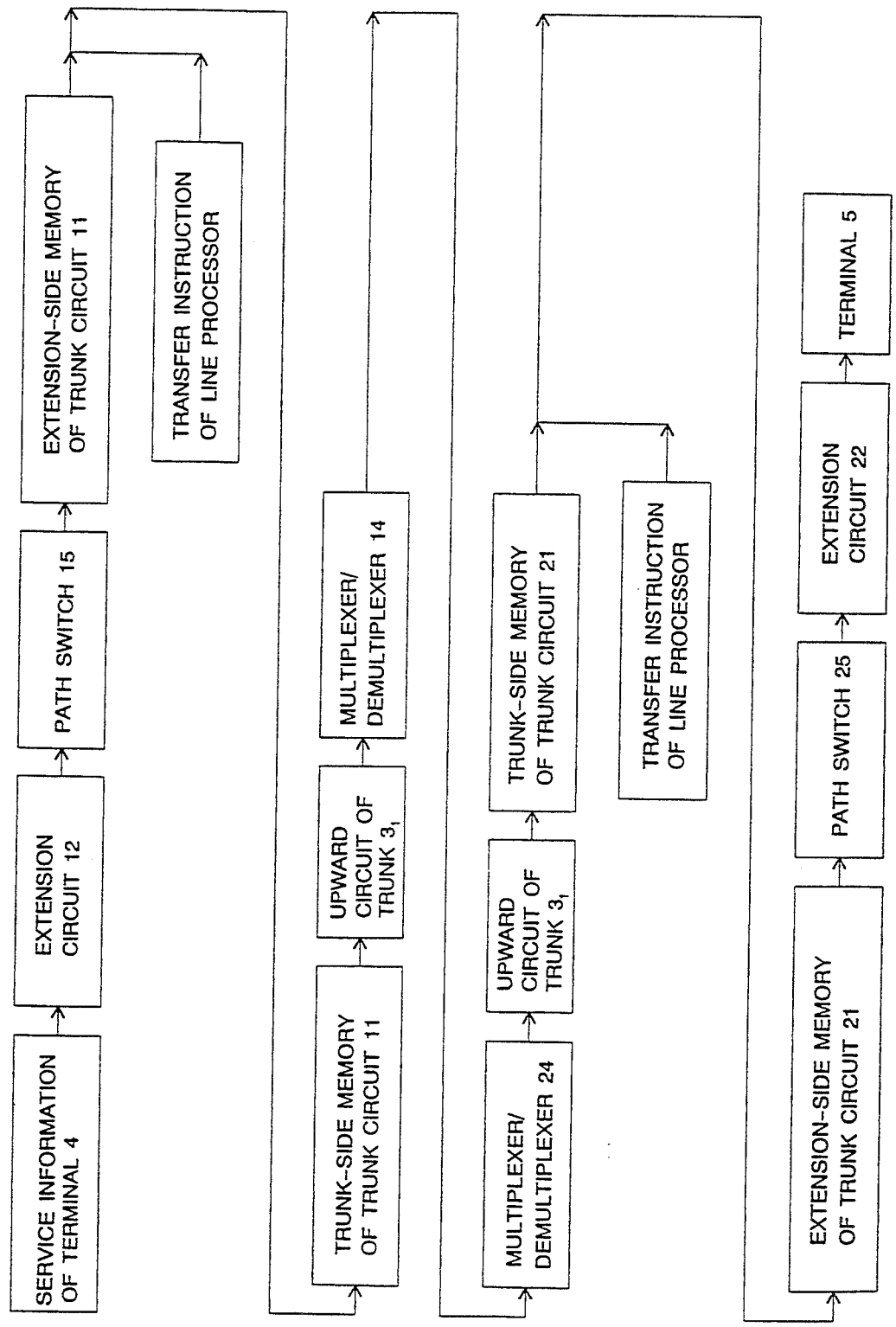
FIG. 17A is an explanatory view showing a transfer route 1 of communications information in the system of FIG. 12.
Figure 17B:
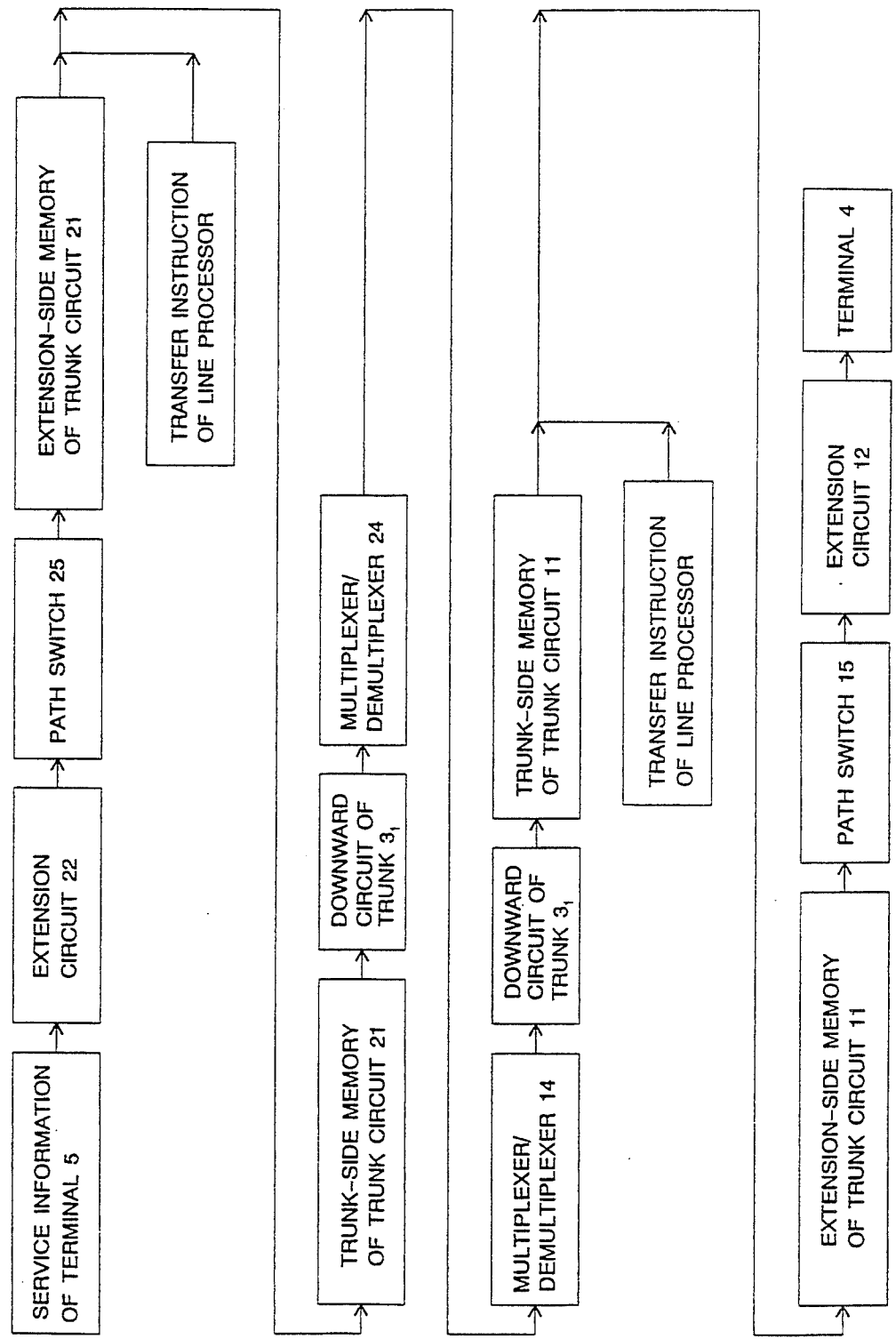
FIG. 17B is an explanatory view showing a transfer route 2 of the communications information in the system of FIG. 12.

FIGS. 17A and 17B are explanatory views of transfer routes for the service information of the terminals 4, 5. FIG. 17A shows a transfer route (transfer route 1) for the service information of the terminal 4. FIG. 17B illustrates a transfer route (transfer route 2) for the service information of the terminal 5.

(2) The calling processor 13 makes the control information memory of the trunk circuit 11 store the $\alpha$ control information via the control line. The processor 13 further gives an instruction to transmit the control information.

(3) The line processor of the trunk circuit 11 transmits the control information within the control information memory $32_1$ to the line processor $31_2$ of the trunk circuit 21 in conformity with the instruction to transmit the control information. The transmitting process in this case is performed based on the control information insert process flowchart shown in FIG. 8.

(4) The line processor of the trunk circuit 11 transmits, to the circuit memory of the trunk circuit 11, a set of information consisting of a-pieces of silent patterns plus i-pieces of control information plus b-pieces of silent patterns by the process (3) in FIG. 8.

(5) The "silent patterns plus control information" within the circuit memory of the trunk circuit 11 are transferred on the transfer route 1 shown in FIG. 17A and stored in the circuit memory of the trunk circuit 21.

(6) The line processor of the trunk circuit 21 analyzes the information stored in the circuit memory in accordance with the control information fetching process flowchart shown in FIG. 9. The "silent patterns plus control information" are still stored in the circuit memory at this moment, and, therefore, the following processes are to be conducted.

(7) The line processor of the trunk circuit 21 causes the control information memory $32_2$ to store a set of information consisting of the i-pieces of control information and the b-pieces of silent patterns by the process in step S63 of FIG. 9. Simultaneously, the extension-side memory $34_2$ stores m-pieces of silent patterns.

(8) The line processor $31_2$ of the trunk circuit 21 transmits the control information within the control information memory $32_2$ to the calling processor 23 via the control line. Incidentally, herein, for a supplementary explanation, if this line processor identifies the i-pieces of control information by the following method at this time, only the i-pieces of control information may be transmitted to the calling processor 23.

Method 1): The line processor analyzes the information elements (information) in the octets under the octet 5 in the control information message format shown in FIG. 15. The line processor then distinguishes a length of content of the information elements and confirms a control information number.

Method 2): The line processor checks whether or not the information is the silent pattern sequentially from the last octet of information stored in the control information message. If defined as the silent pattern, this pattern is deleted. This process is ceased just when the information other than the silent pattern is present.

(9) Further, the following methods may be taken. The calling processor 23 receives the information having such a quantity as to contain the i-pieces of control information and the b-pieces of silent patterns. The processor 23 effects the analysis from the head octet of the information received in accordance with the configurational example of the control information message format shown in FIG. 15. The processor 23 then recognizes the control information number and deletes the silent pattern information. With this process, it follows that the calling processor fetches the $\alpha$ control information.

(10) The calling processor 23 further analyzes the message of this $\alpha$ control information and performs a predetermined process.

(11) Thereafter, if the calling processor 23 transmits the control information to the calling processor 13, the same processes as those in the above terms 1 to 9 are conducted. However, the transfer route 2 shown in FIG. 17 is to be employed.

With such processes, the $\alpha$ control information can be transmitted and received between the calling processors 13, 23 by use of the in-service trunk.

Note that the transmission path between the exchanges 1, 2 in this embodiment is, as illustrated in FIG. 12, a private line of the high-speed digital circuit of 128 Kbps. However, a BRI (Basic Rate Interface) (2B+D channel structured) interface offered by, e.g., NTT (Nippon Telegraph and Telephone Corporation) or KDD (Kokusai Denshin Denwa Co., Ltd.) is employed as a transmission path. A carrier network is connected through this D channel, and thereafter a status to the carrier network is held. Further, the 2B (64 Kbps×2) channel of the carrier network is conceived as a private line, and the control information for the inter-node control is transmitted and received. The present invention is also easily applicable to this case.

Figure 18:
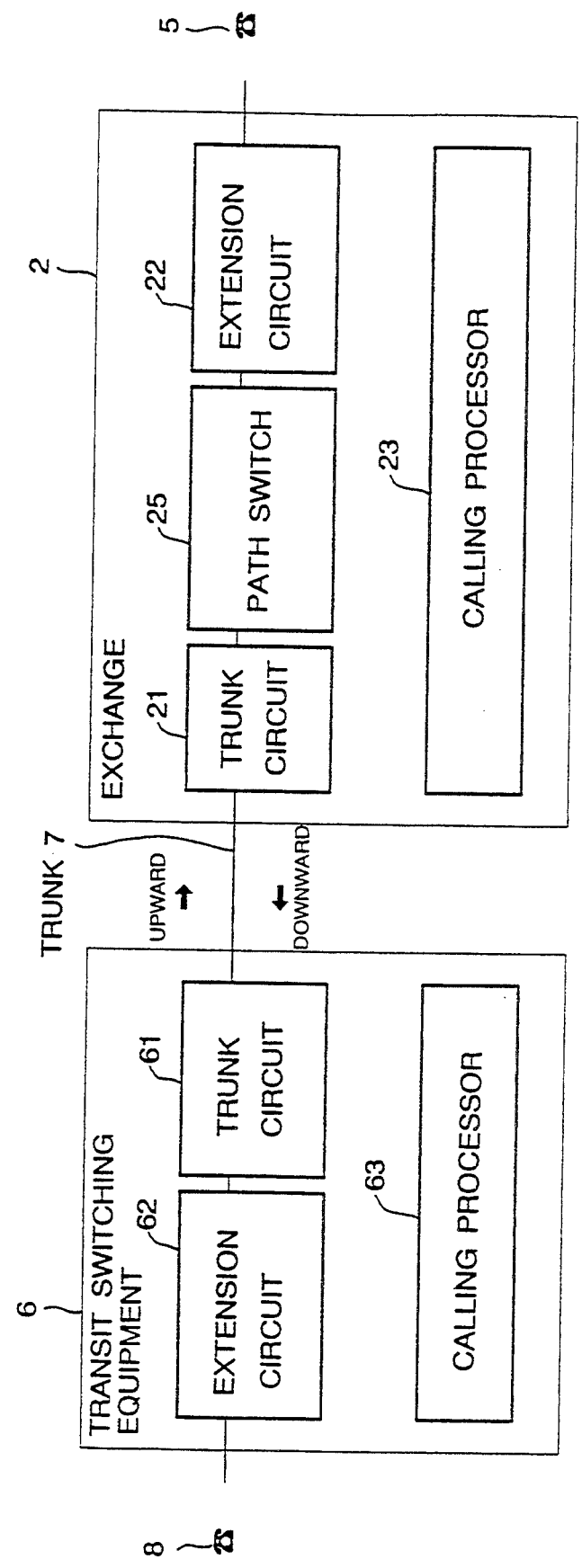
FIG. 18 is a block diagram illustrating a still further concrete construction of the network system adopting the inter-node control in a third embodiment of this invention.

Moreover, the following is a network system in still another embodiment of this invention. A circuit transit switching equipment 6 (having no path switch) is connected to a terminal 8. The circuit transit switching equipment 6 includes a trunk circuit 61, an extension circuit 62 and a calling processor 63 (for performing transit control over call outgoing/incoming connections). This network system is also capable of controlling the same as the above-mentioned for the inter-node control between the circuit transit switching equipment 6 and the same exchange 2 as the one shown in FIG. 4. The configuration as illustrated in FIG. 18 is available for connecting a terminal installed in a remote place to the exchange via the transit circuit.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An inter-node controlling method in a network for transmitting and receiving control information, said network being constructed by connecting trunk circuits of a plurality of exchanges through trunks and connecting one or more terminals to said exchanges, said exchanges each including: a calling processor for performing a calling process; a trunk circuit for connecting said trunks; an extension circuit for connecting said terminals; and a path switch for selectively connecting said trunk circuits to said extension circuit under control of said calling processor, said method comprising, when performing signalling relative to communications between said exchanges, the steps of:
transmitting and receiving at least one item of control information on a trunk connection call between said exchanges and on an operational management maintenance of said exchanges by utilizing a not-in-service channel of a trunk from a time when said trunk connection call takes place to a time before receiving a response of a remote party; and transmitting and receiving said control information by utilizing a no-data period in an in-communication channel of said trunk from a time after receiving the response of said remote party with respect to said trunk connection call to an end-of-communications time.

2. A method according to claim 1, wherein communication information between said exchanges is a voice signal, and said no-data period is a no-voice period.

3. A method according to claim 1, wherein communication information between said exchanges is a data communication signal, and said no-data period is a period flagged as a no-data status.

4. A method according to claim 1, wherein said trunk circuit includes a line processor for effecting a circuit connecting process, a control information memory for storing said control information and a trunk-side memory for storing information transmitted and received between said trunk circuit and said trunk, and wherein said control information is transmitted and received, utilizing an upward/downward communications channel in, channels of said trunk by performing a transmitting process in which said line processor transmits said control information retained in said control information memory to said trunk-side memory from the time when said trunk connection call takes place to the time before receiving the response of said remote party and a receiving process in which said control information memory stores said control information retained in said trunk-side memory.

5. A method according to claim 1, wherein said trunk circuit includes a line processor for effecting a circuit connecting process, a control information memory for storing information transmitted and received between said trunk circuit and said trunk and an extension-side memory for storing information transmitted and received between said trunk circuit and said one or more terminals, and wherein said control information is transmitted and received, from the time after receiving the response of said remote party with respect to said trunk connection call to said end-of-communications time, utilizing said no-data period in said in communication channels of said trunk, by performing a control information inserting process in which said line processor inserts said control information within said control information memory into no-data flag patterns indicating a continuous no-data status that are retained in said extension-side memory and transmits an inserted result to said trunk-side memory and a control information fetching process in which said control information is fetched out of information containing said control information and said no-data flag patterns retained in said trunk-side memory and is stored in said control information memory.

6. A method according to claim 5, wherein communications information between said exchanges is a voice signal, said no-data period is a no-voice period, and said no-data flag patterns are silent flag patterns.

7. A method according to claim 5, wherein communications information between said exchanges is a data communications signal, and said no-data period is a period flagged as a no-data status.

8. A method according to claim 5, wherein said control information inserting process involves replacing, when a predetermined number m of no-data flag patterns continuously exist in said extension-side memory, i-pieces of no-data flag patterns following a predetermined number a of no-data flag patterns on the head of said predetermined number m of no-data flag patterns with i-pieces of control information within said control information memory and transmitting a replaced result to said trunk-side memory, and wherein said control information fetching process involves causing, when said predetermined number a of no-data flag patterns continuously exist in said trunk-side memory and if an $(a+1)$th piece of information is defined as said control information, said control information memory to store $(m-a)$ pieces of information on said $(a+1)$th piece through m-th piece of information, replacing said stored information with the same quantity of no-data flag patterns as said stored information and transmitting a replaced result to said extension-side memory.

9. A method according to claim 5, wherein said control information inserting process involves inserting, when a predetermined number m of no-data flag patterns continuously exist in said extension-side memory, i-pieces of control information within said control information memory following a predetermined number a of no-data flag patterns on the head of said predetermined number m of no-data flag patterns and transmitting an inserted result to said trunk-side memory, and wherein said control information fetching process involves causing, when said predetermined number a of no-data flag patterns continuously exist in said trunk-side memory and if an $(a+1)$th piece of information is defined as said control information, said control information memory to store $(m-a+i)$ pieces of information on said $(a+1)$th piece through $(m+i)$th piece of information, replacing said stored information with the same quantity of no-data flag patterns as said stored information and transmitting a replaced result to said extension-side memory.

10. An inter-node controlling method in a network for transmitting and receiving control information, said network being constructed by connecting, through a trunk, two trunk circuits of a node consisting of an exchange including a calling processor for performing a calling process; a trunk circuit for connecting said trunk; an extension circuit for connecting a terminal; and a path switch for selectively connecting said trunk circuit to said extension circuit under control of said calling processor, and a node consisting of a circuit transit switching equipment including: a trunk circuit for connecting a trunk; an extension circuit for connecting a terminal and a calling processor for controlling said trunk circuit and said extension circuit and by connecting one or more terminals to said each extension circuit, said method comprising, when performing signalling relative to communications between said nodes, the steps of:

transmitting and receiving at least one item of control information on a trunk connection call between said nodes and on an operational management maintenance of said exchanges by utilizing a not-in-service channel of a trunk from a time when said trunk connection call takes place to a time before receiving a response of a remote party; and transmitting and receiving said control information by utilizing a no-data period in said channel of said trunk from a time after receiving the response of said remote party with respect to said trunk connection call to an end-of-communications time.

11. A method according to claim 10, wherein communications information between said nodes is a voice signal, and said no-data period is a no-voice period.

12. A method according to claim 10, wherein communications information between said nodes is a data communications signal, and said no-data period is a period flagged as a no-data status.

13. A method according to claim 10, wherein said trunk circuit of said node includes a line processor for effecting a circuit connecting process, a control information memory for storing control information and a trunk-side memory for storing information transmitted and received between said trunk circuit and said trunk, and wherein said control information is transmitted and received by utilizing an upward/downward communications channel in said channels of said trunk by performing a transmitting process in which said line processor transmits said control information retained in said control information memory to said trunk-side memory from the time when said trunk connection call takes place to the time before receiving the response of said remote party and a receiving process in which said control information memory stores said control information retained in said trunk-side memory.

14. A method according to claim 10, wherein said trunk circuit of said node includes a line processor for effecting a circuit connecting process, a control information memory for storing said control information, a trunk-side memory for storing information transmitted and received between said trunk circuit and said trunk and an extension-side memory for storing information transmitted and received between said trunk circuit and said one or more terminals, and wherein said control information is transmitted and received, from the time after receiving the response of said remote party with respect to said trunk connection call to the end-of-communications time, by utilizing said no-data period in said in-communication channel of said trunk by performing a control information inserting process in which said line processor inserts said control information within said control information memory into no-data flag patterns indicating a continuous no-data status that are retained in said extension-side memory and transmits an inserted result to said trunk-side memory and a control information fetching process in which said control information is fetched out of said information containing said control information and said no-data flag patterns retained in said trunk-side memory and is stored in said control information memory.

15. A method according to claim 14, wherein communications information between said nodes is a voice signal, said no-data period is a no-voice period, and said no-data flag patterns are silent flag patterns.

16. A method according to claim 14, wherein communications information between said nodes is a data communications signal, and said no-data period is a period flagged as a no-data status.

17. A method according to claim 14, wherein said control information inserting process involves replacing, when a predetermined number m of no-data flag patterns continuously exist in said extension-side memory, i-pieces of no-data flag patterns following a predetermined number a of no-data flag patterns on the head of said predetermined number m of no-data flag patterns with i-pieces of control information within said control information memory and transmitting a replaced result to said trunk-side memory, and wherein said control information fetching process involves causing, when said predetermined number a of no-data flag patterns continuously exist in said trunk-side memory and if (a+1)th piece of information is defined as said control information, said control information memory to store (m−a) pieces of information on said (a+1)th piece through m-th piece of information, replacing said stored information With the same quantity of no-data flag patterns as said stored information and transmitting a replaced result to said extension-side memory.

18. A method according to claim 14, wherein said control information inserting process involves inserting, when a predetermined number m of no-data flag patterns continuously exist in said extension-side memory, i-pieces of control information within said control information memory following a predetermined number a of no-data flag patterns on the head of said predetermined number m of no-data flag patterns and transmitting an inserted result to said trunk-side memory, and wherein said control information fetching process involves causing, when said predetermined number a of no-data flag patterns continuously exist in said trunk-side memory and if an (a+1)th piece of information is defined as said control information, said control information memory to store (m−a+i) pieces of information on said (a+1)th piece through (m+i)th piece of information, replacing said stored information with the same quantity of no-data flag patterns as said stored information and transmitting a replaced result to said extension-side memory.

19. An inter-node controlling apparatus in a network for performing signalling relative to communications between exchanges, said network being constructed by connecting trunk circuits of a plurality of exchanges through trunks and connecting one or more terminals to said exchanges, said exchanges each including: a calling processor for performing a calling process; a trunk circuit for connecting said trunks; an extension circuit for connecting said terminals; and a path switch for selectively connecting said trunk circuits to said extension circuit under control of said calling processor, said apparatus comprising:

a first control information communications means for transmitting and receiving at least one item of control information on a trunk connection call between said exchanges and on an operational management maintenance of said exchanges by utilizing a not-in-service channel of a trunk from a time when said trunk connection call takes place to a time before receiving a response of a remote party; and a second control information communications means for transmitting and receiving said control information by utilizing a no-data period in an in-communication channel of said trunk from a time after receiving the response of said remote party with respect to said trunk connection call to an end-of-communications time through said first control information communications means.

20. An apparatus according to claim 19, wherein communications information between said exchanges is a voice signal, and said no-data period is a no-voice period.

21. An apparatus according to claim 19, wherein communications information between said exchanges is a data communications signal, and said no-data period is a period flagged as a no-data status.

22. An apparatus according to claim 19, wherein said trunk circuit includes: a control information memory for storing said control information; a trunk-side memory for storing information transmitted and received between said trunk circuit and said trunk; and a line processor for transmitting and receiving said control information by utilizing an upward/downward communications channel in channels of said trunk from a time when said trunk connection call takes place to a time before receiving the response of said remote party, said line processor having a transmission processing means for transmitting said control information retained in said control information memory to said trunk-side memory and a receipt processing means for causing said control information memory to store said control information retained in said trunk-side memory.

23. An apparatus according to claim 19, wherein said trunk circuit includes: a control information memory for storing said control information; a trunk-side memory for storing information transmitted and received between said trunk circuit and said trunk; an extension-side memory for storing information transmitted and received between said trunk circuit and said one or more terminals; and a line processor for transmitting and receiving said control information by utilizing said no-data period in said in-communication channel of said trunk from the time after receiving the response of said remote party with respect to said trunk connection call to said end-of-communications time, said line processor having a control information inserting means for inserting said control information within said control information memory into no-data flag patterns indicating a continuous no-data status that are retained in said extension-side memory and transmitting an inserted result to said trunk-side memory and a control information fetching means for fetching said control information out of information containing said control information and said no-data flag patterns retained in said trunk-side memory and causing said control information memory to store said fetched control information.

24. An apparatus according to claim 23, wherein communications information between said exchanges is a voice signal, said no-data period is a no-voice period, and said no-data flag patterns are silent flag patterns.

25. An apparatus according to claim 23, wherein communications information between said exchanges is a data communications signal, and said no-data period is a period flagged as a no-data status.

26. An apparatus according to claim 23, wherein said control information inserting means includes a means for replacing, when a predetermined number m of no-data flag patterns continuously exist in said extension-side memory, i-pieces of no-data flag patterns following a predetermined number a of no-data flag patterns on the head of said predetermined number m of no-data flag patterns with i-pieces of control information within said control information memory and transmitting a replaced result to said trunk-side memory, and wherein said control information fetching means includes a means for causing, when said predetermined number a of no-data flag patterns continuously exist in said trunk-side memory and if an (a+1)th piece of information is defined as said control information, said control information memory to store (m−a) pieces of information on said (a+1)th piece through m-th piece of information, replacing said stored information with the same quantity of no-data flag patterns as said stored information and transmitting a replaced result to said extension-side memory.

27. An apparatus according to claim 23, wherein said control information inserting means includes a means for inserting, when a predetermined number m of no-data flag patterns continuously exist in said extension-side memory, i-pieces of control information within said control information memory following a predetermined number a of no-data flag patterns on the head of said predetermined number m of no-data flag patterns and transmitting an inserted result to, said trunk-side memory, and wherein said control information fetching means includes a means for causing, when said predetermined number a of no-data flag patterns continuously exist in said trunk-side memory and if an (a+1)th piece of information is defined as said control information, said control information memory to store (m−a+i) pieces of information on said (a+1)th piece through (m+i)th piece of information, replacing said stored information with the same quantity of no-data flag patterns as said stored information and transmitting a replaced result to said extension-side memory.

28. An inter-node controlling apparatus in a network for performing signalling relative to communications between nodes, said network being constructed by connecting, through a trunk, two trunk circuits of a node consisting of an exchange including a calling processor for performing a calling process; a trunk circuit for connecting said trunk; an extension circuit for connecting a terminal; and a path switch for selectively connecting said trunk circuit to said extension circuit under control of said calling processor, and a node consisting of a circuit transit switching equipment including: a trunk circuit for connecting a trunk; an extension circuit for connecting a terminal and a calling processor for controlling said trunk circuit and said extension circuit and by connecting one or more terminals to said each extension circuit, said apparatus comprising:
a first control information communications means for transmitting and receiving at least one item of control information on a trunk connection call between said nodes and on an operational management maintenance of said exchanges by utilizing a not-in-service channel of a trunk from a time when said trunk connection call takes place to a time before receiving a response of a remote party; and
a second control information communications means for transmitting and receiving said control information by utilizing a no-data period in said channel of said trunk from a time after receiving the response of said remote party with respect to said trunk connection call to an end-of-communications time through said first control information communications means.

29. An apparatus according to claim 28, wherein communications information between said nodes is a voice signal, and said no-data period is a no-voice period.

30. An apparatus according to claim 28, wherein communications information between said nodes is a data communications signal, and said no-data period is a period flagged as a no-data status.

31. An apparatus according to claim 28, wherein said trunk circuit of said node includes: a control information memory for storing said control information; a trunk-side memory for storing information transmitted and received between said trunk circuit and said trunk; and a line processor for transmitting and receiving said control information by utilizing an upward/downward communications channel of said trunk from the time when said trunk connection call takes place to the time before receiving the response of said remote party, said line processor having a transmission processing means for transmitting said control information retained in said control information memory to said trunk-side memory and a receipt processing means for causing said control information memory to store said control information retained in said trunk-side memory.

32. An apparatus according to claim 28, wherein said trunk circuit of said node includes: a control information memory for storing said control information; a trunk-side memory for storing information transmitted and received between said trunk circuit and said trunk; an extension-side memory for storing information transmitted and received between said trunk circuit and said one or more terminals; and a line processor for transmitting and receiving said control information by utilizing and receiving said control information by utilizing said no-data period in said in, communication channel of said trunk from the time after receiving the response of said remote party with respect to said trunk connection call to the end-of-communications time, said line processor having a control information inserting means for inserting said control information within said control information memory into no-data flag patterns indicating a continuous no-data status that are retained in said extension-side memory and transmitting an inserted result to said trunk-side memory and a control information fetching means for fetching said control information out of said information containing said control information and said no-data flag patterns retained in said trunk-side memory and causing said control information memory to store said fetched control information.

33. An apparatus according to claim 32, wherein communications information between said nodes is a voice signal, said no-data period is a no-voice period, and said no-data flag patterns are silent flag patterns.

34. An apparatus according to claim 32, wherein communications information between said nodes is a data communications signal, and said no-data period is a period flagged as a no-data status.

35. An apparatus according to claim 32, wherein said control information inserting means includes a means for replacing, when a predetermined number m of no-data flag patterns continuously exist in said extension-side memory, i-pieces of no-data flag patterns following a predetermined number a of no-data flag patterns on the head of said predetermined number m of no-data flag patterns with i-pieces of control information within said control information memory and transmitting a replaced result to said trunk-side memory, and wherein said control information fetching means includes a means for causing, when said predetermined number a of no-data flag patterns continuously exist in said trunk-side memory and if an (a+1)th piece of information is defined as said control information, said control information memory to store (m−a) pieces of information on said (a+1)th piece through m-th piece of information, replacing said stored information with the same quantity of no-data flag patterns as said stored information and transmitting a replaced result to said extension-side memory.

36. An apparatus according to claim 32, wherein said control information inserting means includes a means for inserting, when a predetermined number m of no-data flag patterns continuously exist in said extension-side memory, i-pieces of control information within said control information memory following a predetermined number a of no-data flag patterns on the head of said predetermined number m of no-data flag patterns and transmitting an inserted result to said trunk-side memory, and wherein said control information fetching means includes a means for causing, when said predetermined number a of no-data flag patterns continuously exist in said trunk-side memory and if an (a+1)th piece of information is defined as said control information, said control information memory to store (m−a+i) pieces of information on said (a+1)th piece through (m+i)th piece of information, replacing said stored information with the same quantity of no-data flag patterns as said stored information and transmitting a replaced result to said extension-side memory.

* * * * *